(12) United States Patent
Lamba et al.

(10) Patent No.: US 8,880,515 B2
(45) Date of Patent: *Nov. 4, 2014

(54) DETERMINING CONCEPTS ASSOCIATED WITH A QUERY

(71) Applicant: Wal-Mart Stores, Inc., Bentonville, AR (US)

(72) Inventors: Digvijay Singh Lamba, Sunnyvale, CA (US); Wang Chee Lam, San Jose, CA (US); Michel A. Tourn, Mountain View, CA (US)

(73) Assignee: Wal-Mart Stores, Inc., Bentonville, AR (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/021,989

(22) Filed: Sep. 9, 2013

(65) Prior Publication Data
US 2014/0081962 A1     Mar. 20, 2014

Related U.S. Application Data

(63) Continuation of application No. 13/350,538, filed on Jan. 13, 2012, now Pat. No. 8,560,532, which is a continuation of application No. 12/150,311, filed on Apr. 24, 2008, now Pat. No. 8,122,016.

(60) Provisional application No. 60/926,040, filed on Apr. 24, 2007.

(51) Int. Cl.
*G06F 7/00*       (2006.01)
*G06F 17/30*      (2006.01)

(52) U.S. Cl.
CPC ...... *G06F 17/3053* (2013.01); *G06F 17/30976* (2013.01)
USPC .......................................... 707/723; 707/748

(58) Field of Classification Search
CPC ................. A61B 2562/0233; A61B 2562/046; A61B 5/0073; G06F 17/18; G06F 19/20; G06F 19/24; G06F 2216/03
USPC .................. 707/707–713, 723–739, 748–753
See application file for complete search history.

(56) References Cited

U.S. PATENT DOCUMENTS

| | | | |
|---|---|---|---|
| 7,788,265 B2 * | 8/2010 | Morscher et al. | 707/740 |
| 2005/0144162 A1 * | 6/2005 | Liang | 707/3 |
| 2006/0074907 A1 * | 4/2006 | Singhal et al. | 707/6 |

* cited by examiner

*Primary Examiner* — Tony Mahmoudi
*Assistant Examiner* — Tuan A Pham
(74) *Attorney, Agent, or Firm* — David R. Stevens; Stevens Law Group

(57) ABSTRACT

Determining one or more concepts associated with a query is disclosed. A query is received. A list of concepts and associated scores is received. The concepts fit within a concept hierarchy. A density function is used to evaluate the received concepts. One or more concepts are associated with the query based at least in part on the results of the density function.

17 Claims, 21 Drawing Sheets

```
202 ─  Car Manufacturers | Transportation | 20 ──214
204 ─  Transportation | Society | 20
       ...
206 ─  Honda | Car Manufacturers | 10 ──216
208 ─  Honda Civic | Honda | 10
210 ─  Honda Civic RX | Honda Civic | 10
       ...
212 ─  Car Manufacturers | Kosmix Autos | 5 ──218
       ...
```

FIG. 2A

```
       Kosmix Root      :    000000
       Kosmix Autos     :    000001
       Kosmix Nature    :    000002
       Kosmix Health    :    000003
       ...
       Jaguar_animal    :    103816
       Rabbit           :    103817
       ...
       Honda Civic RX   :    938173
       ...
```

FIG. 2B

```
       Jaguar | Jaguar_car | 20 | (hom)
       Jaguar | Jaguar_animal | 20 | (hom)
       Jaguar | Mac OS Jaguar | ...
       ...
       Puma | Cougar | 20 | (syn)
       Mountain Lion | Cougar | 20 | (syn)
       Panther | Cougar | 20 | (syn)
```

FIG. 2C

```
280 ─  Parent:Countries by Continent   1    3
282 ─  Parent:Living People           -1    1
```

FIG. 2D

| | Concept | Final Score | Text Score | Observed Co-occur | Concept DF | Expected Co-occur | Confidence |
|---|---|---|---|---|---|---|---|
| 1020 | jaguar_car | 2539.31 | 1529.26 | 16526 | 88802 | 7.74753 | 10 |
| 1022 | jaguar_animal | 2441.15 | 1130.43 | 2309 | 5791 | 0.505235 | 10 |
| 1024 | jacksonville+jaguars | 2360.55 | 1146.54 | 2818 | 19906 | 1.7367 | 10 |
| 1026 | jaguar+xjr | 2228.41 | 675.948 | 417 | 1054.18 | 0.0919721 | 9 |
| 1028 | david+garrard | 2118.56 | 735.872 | 562 | 4456.83 | 0.388836 | 8 |
| 1030 | jacksonville+municipal+stadium | 1961.09 | 374.444 | 208 | 1323.83 | 0.115498 | 6 |
| 1032 | sedan | 1796.24 | 595.771 | 1044 | 112321 | 9.79946 | 4 |
| 1034 | convertible | 1781.68 | 658.368 | 908 | 115011 | 10.0341 | 4 |
| 1036 | jaguar+dealer | 1772.38 | 336.003 | 380 | 11980.2 | 1.04521 | 4 |
| 1038 | nfl | 1770.55 | 773.801 | 2882 | 958148 | 83.5936 | 4 |
| 1040 | afc+south | 1761.41 | 378.391 | 123 | 2798 | 0.244111 | 3 |
| 1042 | litre | 1748.65 | 420.9 | 515 | 34024.2 | 2.96844 | 3 |
| 1044 | vehicle | 1698.78 | 578.014 | 2638 | 1.00E+06 | 87.275 | 2 |
| 1046 | alltel+stadium | 1675.81 | 274.182 | 147 | 4766.67 | 0.415868 | 2 |
| 1048 | v12 | 1666.59 | 349.471 | 215 | 12798.5 | 1.1166 | 2 |
| 1050 | jaguar+super+v8 | 1662.41 | 160.741 | 57 | 592.8 | 0.0517188 | 2 |
| 1052 | panthera+onca | 1662.33 | 158.826 | 22 | 130 | 0.0113419 | 2 |
| 1054 | vdp | 1660.93 | 213.515 | 107 | 2343.71 | 0.204477 | 2 |
| 1056 | jaguar+racing | 1660.79 | 296.169 | 280 | 16386.1 | 1.42961 | 1 |
| 1058 | sportwagon | 1660.59 | 252.44 | 142 | 4566.82 | 0.398432 | 1 |
| 1060 | liter | 1657.71 | 433.765 | 603 | 92515.4 | 8.07151 | 1 |
| 1062 | touchdown | 1621.09 | 571.708 | 504 | 132983 | 11.6021 | 1 |
| 1064 | monocoque | 1613.52 | 213.105 | 67 | 1618.93 | 0.141244 | 1 |

FIG. 10

DETERMINING CONCEPTS ASSOCIATED WITH A QUERY

CROSS REFERENCE TO OTHER APPLICATIONS

This application is a continuation of co-pending U.S. patent application Ser. No. 12/150,311, entitled DETERMINING CONCEPTS ASSOCIATED WITH A QUERY filed Apr. 24, 2008 which is incorporated herein by reference for all purposes, which claims priority to U.S. Provisional Patent Application No. 60/926,040 entitled AUTOMATIC PAGE LAYOUT filed Apr. 24, 2007 which is also incorporated herein by reference for all purposes.

BACKGROUND OF THE INVENTION

One way that people gain knowledge is to formulate queries and provide them to search engines. Some queries are unambiguous, such as "pictures of the Eiffel Tower." The intent of that user is very likely to be finding pictures of the Eiffel Tower. However, there exist circumstances in which it can be difficult to ascertain the intent of the user. For example, suppose a user has provided a query of "my twelve year old child has a foot infection what should I do?" That query mentions neither "juvenile" nor "diabetes"—the two terms which together represent the user's most likely intent. Any results returned are likely to be of poorer quality than if the user had provided a query that included "juvenile diabetes." Further, in some cases the provided query may be ambiguous. Suppose a user has provided a query of "jaguar." In such a circumstance it is difficult to discern whether the user is interested in the mammal, the automobile, the operating system, or other permutations such as the Florida sports team. A statistically significant number of results for the "jaguar" query are likely to be irrelevant to the user because they will collectively reflect all four concepts, instead of the one meaning the user is most interested in. There thus exists an ongoing need to have a better way to evaluate queries and determine their meaning.

BRIEF DESCRIPTION OF THE DRAWINGS

Various embodiments of the invention are disclosed in the following detailed description and the accompanying drawings.

FIG. 2A is a portion of an arc list according to one embodiment.

FIG. 2B is a portion of a vertex list according to one embodiment.

FIG. 2C is a portion of an arc list according to one embodiment.

FIG. 2D is a portion of a subtree preferences list according to one embodiment.

FIG. 10 illustrates an example of scores determined as part of a process for associating a query with a concept.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
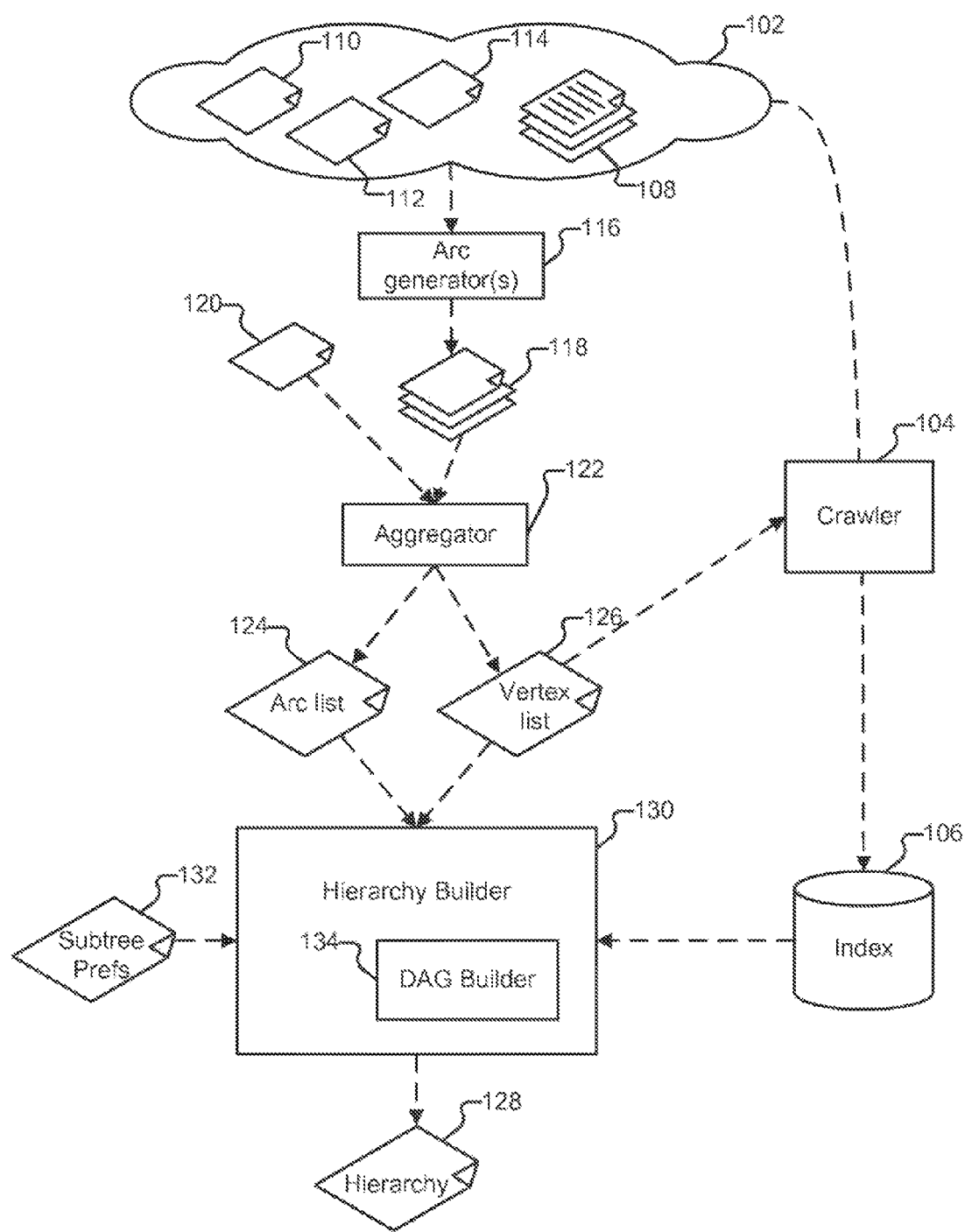
FIG. 1 illustrates an embodiment of a system for creating a hierarchy of concepts from a corpus of documents.

FIG. 1 illustrates an embodiment of a system for creating a hierarchy of concepts from a corpus of documents. In the example shown, collection 102 includes a group of World Wide Web pages 108, that are crawled, processed, and indexed by a crawler 104 and stored, along with assorted scores and other information, in index 106.

As described in more detail below, crawler 104 performs tasks such as tagging the documents stored in index 106 with subject type concepts and with information type concepts (also referred to herein as "infotypes"). Crawler 104 also performs and stores the results of frequency and cooccurrence counts. Crawler 104 may be a single device, or its functionality may be provided by multiple devices. For example, elements typically used in conjunction with a crawler to create an index, such as an indexer, are described herein as being provided by crawler 104, but may also be performed by separate devices or components and the techniques described herein adapted accordingly. For example, in some embodiments cooccurrence counts are performed by concept lighting engine 1304.

Documents in collection 102 can include, but are not limited to text files, multimedia files, and other content. In some embodiments, collection 102 includes documents found on an intranet. Also included in collection 102 are a variety of concept data sources 110-114. In the example shown, source 110 is the set of web pages known collectively as Wikipedia (and available, e.g., at http://en.wikipedia.org). Source 112 is a directory of automobile makes and models, and source 114 is a taxonomy of pharmaceuticals. In some cases, such as with Wikipedia, the pages are used both as concept data sources, and are also included in group 108 and are crawled accordingly. In other cases, such as with the directory of automobile makes and models, the information may be restricted or otherwise not available to crawler 104, and the concept data source will serve only as a concept data source and not be included in group 108.

Concept data sources 110-114 each provide information that conveys some kind of relation between concepts and can be used as a source of concepts and also as a source of hierarchical relations between at least some of those concepts. For example, suppose a sample entry in automobile directory 112 is: "2008 Honda Civic Sedan XL." Using the techniques described herein it is possible to extract hierarchical information from the entry, for example that the "2008 Sedan XL" is a type of "Honda Civic," and that a "Honda Civic" is manufactured by "Honda." Pages within Wikipedia typically refer to their conceptual parents by link. For example, the Wikipedia page on the topic of "Astronomy" has a link to its parent (typically by labeling the parent as its "category"), the more general subject of "Science." The Wikipedia page on the topic of "India" includes a link to "South Asian Countries," which includes a link to "Asian Countries" which includes a link to "Countries by Continent." The entries in the pharmaceutical taxonomy are likewise related to one another in a manner that can be harvested using the techniques described herein.

For each of the concept data sources 110-114, one or more arc generators 116 are used to parse the respective concept data source, extract concepts and relations between concepts, and store the information in a common format (118) that can be consumed by aggregator 122. For example, a Wikipedia arc generator is configured to obtain and parse Wikipedia data made available as a single XML file. From the XML file, pairs of concepts—an article and a category to which it belongs—are extracted. Another arc generator is configured to parse the automobile directory (e.g., provided as a spreadsheet) and generate arcs accordingly, such as by knowing that for each line of the spreadsheet, the first column (year) should be combined with the last column to form "2008 Sedan XL," which has as its parent the second and third column ("Honda Civic"), which has as its parent just the second column ("Honda"). As used herein, an arc is a directional edge between two concepts. A concept is a word n-gram with meaning. One relation between concepts as used herein is an "is a" ("containing") relation. For example, "Physics:Science" is an arc that means "physics is a science" ("science contains physics"). As described in more detail below, additional relations may also be employed, such as by homonym and synonym arcs. Other directed relations between arcs that convey meaning may also be employed, and the techniques described herein adapted as applicable. For example, case variants and tokenization can be handled through the use of flags.

The respective content of concept data sources 110-114 may change at various times, and arc generators 116 are configured to obtain and process fresh versions of data from their corresponding concept data sources as applicable so that files 118 reflect the most currently known concepts and relations from those sources. For example, Wikipedia (110) changes frequently, while the content of the pharmaceutical taxonomy 114 may change very infrequently. As such, in various embodiments, arc generators 116 periodically process their respective sources according to a schedule appropriate to the source (e.g., with the Wikipedia arc generator running weekly, and the pharmaceutical arc generator running monthly). Editorial list 120 is a manually maintained list of arcs and relations used, for example, to designate a fixed set of top level concepts (also referred to herein as "verticals") and to ensure that those top level concepts are not moved underneath one another or omitted.

Aggregator 122 aggregates the source-specific arc files 118 extracted by their respective arc generators 116 and the editorial list of arcs 120 and creates as output arc list 124 and vertex list 126. As described in more detail below, arc list 124 is a list of edges and properties that will be used to construct a concept hierarchy 128. Each time aggregator 122 runs, the newly constructed arc list 124 replaces any previously constructed arc list. Vertex list 126 is a persistent list of globally unique concepts that monotonically increases—maintaining a set of stable concept identifiers over the iterations of aggregator 122's processing, and growing only when a concept not previously seen is encountered by aggregator 122, which is then appended to the list.

As described in more detail below, hierarchy builder 130 constructs hierarchy 128 using arc list 124 and additional information such as a list of subtree preferences 132 and information obtained from index 106. The subtree preferences list 132 includes rules to be considered by hierarchy builder 130 when evaluating arc list 124. In various embodiments hierarchy 128 is stored as a list of pairs of concepts, a weight, and optionally other arc attributes such as homonym and synonym indicators. The weight is a rank indicating whether the arc is the primary arc between a concept and a parent ("1") or whether the arc is an additional arc (e.g., "2" or "3") that was inserted into the hierarchy after the primary arc was selected.

In some embodiments hierarchy builder 130 constructs hierarchy 128 by building a directed graph based on the information it receives, and then extracting a directed minimum spanning tree ("DMST") from that graph (in which every concept (also referred to herein as a "node") present in the tree except the root has exactly one parent, and no cycles or orphans are present). A variety of techniques for finding a minimum spanning tree have been developed. One example is the Chu/Liu-Edmonds algorithm.

Hierarchy builder 130 optionally employs a DAG builder 134, which inserts additional nodes into the DMST to form a directed acyclic graph ("DAG") of concepts. An optional interface allows an administrator to view why nodes are placed in the hierarchy where they are and to audit the effects of making changes to the rules used in constructing the hierarchy. For example, if certain nodes are not consistently being placed under appropriate parents, an administrator can make additions to the subtree preferences list 132 or add entries to editorial arc list 120 as applicable. For example, an administrator may use the interface to specify that when B has C as a parent and A has a choice of parent B or C, A should select B as its parent so that a deeper hierarchy is created. This property of A, B, and C is sometimes referred to as transitive reduction.

FIG. 2A is a portion of an arc list according to one embodiment. In the example shown—a portion of aggregated arc list 124—lines 202 and 204 were provided by the Wikipedia arc list 118, lines 206-210 were provided by the automobile directory arc list 118, and line 212 was provided by editorial arc list 120. As described in more detail below, one task performed by hierarchy builder 130 is a determination of a "best parent" for a concept from among its candidate parents. In the example shown, "Car Manufacturers" has two candidate parents. The first is "Transportation" as suggested by Wikipedia (202) and the second is "Kosmix Autos" as suggested by the editorial arc list (212).

One factor that can be considered in the determination of which candidate parent is the best, is what score is assigned (e.g., by an administrator) to each of the candidate parents' concept source (referred to herein as an "arc rank" score). Typically, the arcs provided by specialized concept sources (such as the automobile directory) are preferred over more general concept sources (such as Wikipedia). In the example shown in FIG. 2A, a lower arc rank score indicates a better (preferred) source. In some embodiments, arc rank generators 116 are configured with what arc rank score should be assigned their respective arcs, and those scores are included in the source specific arc rank files 118. In other embodiments, aggregator 122 is configured by an administrator with a list of sources and their respective scores.

Wikipedia as a source has a score of 20, as indicated in region 214. The automobile directory is considered a "better" source of information than Wikipedia for its specialized information on automobiles, and therefore, each of the arcs that are contributed to arc list 124 by its arc list 118 receive a score of 10, as indicated in region 216. The editorial arc list is intended to override entries in arc list 124 provided by source specific arc lists 118 and has an even better (lower preference order) score as indicated in region 218. As described in more detail below, a graph constructed from the data shown in FIG. 2A would include a leaf "Honda Civic RX" which is a "Honda Civic" which is made by "Honda" which is a "Car Manufacturer(s)" which is contained by "Kosmix Autos."

FIG. 2B is a portion of a vertex list according to one embodiment. The vertex list 126 represents a list of all known concepts and is used by crawler 104 to perform document frequency counts as described in more detail below. In the example shown, the vertex list is maintained in the form of human readable concept (column 1) and unique identifier (column 2). For example, "Kosmix Root," which serves as the root of the DMST produced by hierarchy builder 130 has a unique ID of "000000," while the concept "rabbit" has a unique ID of "103817."

FIG. 2C is a portion of an arc list according to one embodiment. Some word n-grams, such as "jaguar," have ambiguous meanings absent additional context. For example, "jaguar" could refer to the automobile, the mammal, an operating system, etc. Wikipedia attempts to mitigate such ambiguity by presenting a "disambiguation page" in scenarios such as where a user types in the ambiguous term into a search box. A related problem is that of synonyms. For example, "puma," "mountain lion," "panther," and "cougar" are all terms used to refer to the animal *Felidae Puma P. concolor*. Wikipedia attempts to mitigate the proliferation of entries by designating one of the terms as a "main" entry, and redirecting to the main entry any attempts to access information by using the synonymous term. For example, "J_K_Rowling" (a pen name) is the main entry for the author whose legal name is "Joanne Murray." If a user of Wikipedia attempts to access an article on "Joanne Murray," they are redirected to the entry titled "J_K_Rowling." The homonym and synonym annotations are made available in hierarchy 128 and can be used by a lighting system as described in more detail below.

In the example shown in FIG. 2C—a portion of aggregated arc list 124—each of the lines was provided by the Wikipedia arc list 118. The Wikipedia arc generator 116 is configured to recognize disambiguation pages when parsing the Wikipedia source XML file and record as arcs the ambiguous term and each of the disambiguated options in the arc list 118 as a pair, along with a "hom" (for homonym) flag. Each disambiguated word is given a separate entry in the vertex file, such as the "Jaguar_animal" line shown in FIG. 2B. The Wikipedia arc generator 116 is also configured to recognize redirection pages when parsing the Wikipedia source XML file and records as arcs each of the synonyms and the main entry ("cougar") in the arc list 118 as a pair, along with a "syn" (for synonym) flag. In some embodiments different weights are given to homonyms and/or synonyms over normal arcs instead of or in addition to the use of flags.

In some embodiments aggregator 122 is configured to remove homonym arcs in which the ambiguous term and the disambiguated term do not begin with the same word, so that the over generation of homonym arcs is reduced. For example, since "Mac OS Jaguar" does not begin with "Jaguar," it is removed (or omitted, as applicable) from arc list 124. As another example, Wikipedia offers "Fiona Apple" as a disambiguation of "Apple." Such an arc would likewise be deleted or omitted from arc list 124.

FIG. 2D is a portion of a subtree preferences list according to one embodiment. In the example shown, the first column is the name of a concept, the second column is a score, and the third column is a depth. When hierarchy builder 130 determines a best parent for a concept from among its candidate parents, one factor that can be considered is whether there is relevant information in the subtree preferences list. A subtree preferences list can be used to reduce the likelihood that a bad parent (e.g., that does not maintain the "is a"/containing relationship) will be selected over a better parent (e.g., that does preserve the relation). For example, many famous people will have as a candidate parent the concept "living people." There are over 300,000 such entries in Wikipedia. Entry 282 in the subtree preferences list states that any arc in which a concept has as a candidate parent "living people" is to be disfavored. Concepts such as "living people" and "things in 1900" exist in Wikipedia but their inclusion in hierarchy 128 is generally disfavored. While Stephen Hawking and Sting are both "living people" and contained by that Wikipedia category, a more meaningful hierarchy can be constructed if their respective parents are "Scientists" and "Musicians." Virtually all people present in the living people category of Wikipedia have something to recommend about themselves beyond the fact that they are alive. Such arcs are disfavored rather than discarded in some embodiments to avoid creating orphan nodes.

In contrast, entry 280 states that any chain of arcs (with up to 3 levels distance) that includes a parent of "countries by continent" is to be preferred. In some embodiments entries in the subtree preferences list are applicable at all depths and the depth column is omitted. What entries should be included in the subtree preferences list (and what scores/depths should be assigned) is generally subjective, can be refined over time, such as by evaluating logs. The subtree preferences provide a mechanism for an administrator to remove or favor a potentially large number of arcs without having to manually enter rules for each arc. For example, by preferring "countries by continent," all countries listed in Wikipedia will tend to be grouped under countries by continent (possibly at varying depth levels), and an administrator need not specify a rule for each country.

Figure 3:
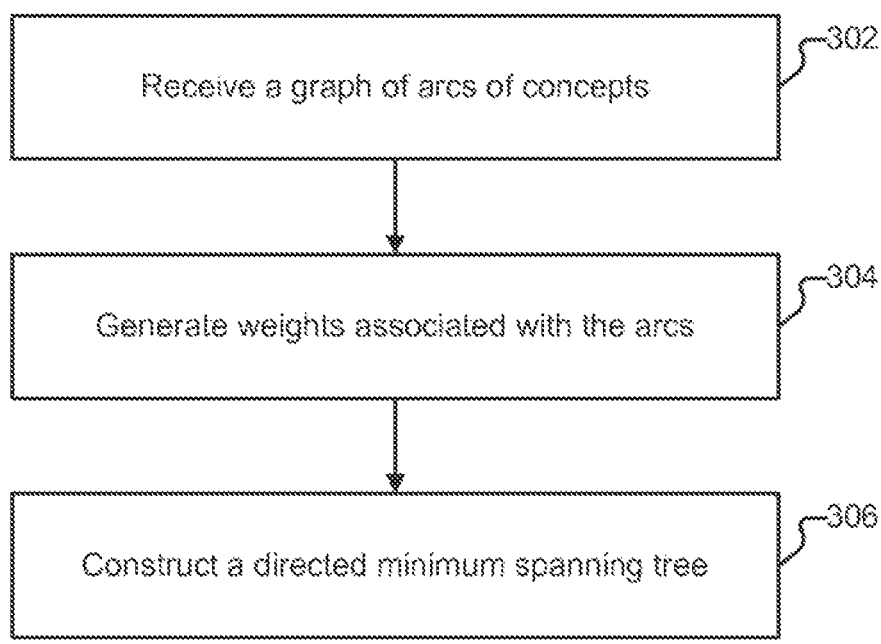
FIG. 3 is a flow chart illustrating an embodiment of a process for creating a hierarchy of concepts from a corpus of documents.

FIG. 3 is a flow chart illustrating an embodiment of a process for creating a hierarchy of concepts from a corpus of documents. In some embodiments the process shown in FIG. 3 is performed by hierarchy builder 130.

The process begins at 302 when a graph of arcs of concepts is received. In some embodiments the graph includes the XML representation of Wikipedia. In some embodiments the graph comprises an arc list such as arc list 124. Other sources of arcs of concepts, at least some of which can be connected to form a graph (irrespective of whether that graph contains some orphans or cycles) may also be used, as applicable. For example, in some embodiments a graph or portions thereof is received from a third party at 302.

At 304, weights associated with the arcs in the graph are generated. As described in more detail below, a variety of techniques can be used, individually and in combination, to generate weights at 304. For example, arc rank scores, Boolean values, cooccurrence scores, mutual information, etc., can be used to form a single weight or a vector of weights at 304.

At 306, a directed minimum spanning tree is extracted from the graph received at 302. In some embodiments preprocessing is performed, such as to remove orphan nodes which cannot be reached from the root, and the directed minimum spanning tree is extracted from the preprocessed graph rather than the graph as received at 302. One way of constructing a DMST is as follows. For each node in the graph, a single parent is selected, such as by using the vector of weights generated at 304 to evaluate candidate parents. By biasing the selection of parents toward the best parent (e.g., the one with the lowest source score), an attempt is made to preserve the consistency of the "is a"/containing relationship up the DMST, such as that calculus is a form of mathematics. Next, any cycles in the graph are detected by hierarchy builder 130. An example of a cycle is an arc from "ships" to "boats" and another from "boats" to "ships" both being present in the graph. Sometimes cycles are created in Wikipedia data because two nodes are imputed to have a hierarchical relationship when they are in fact peers. For example a node "Bert" may have as a parent "Ernie" and vice versa. Hierarchy builder 130 runs a process to reduce the number of cycles. The selection of a best parent, the detection of cycles, and the reduction of cycles continues iteratively until an acyclic tree is formed. As described in more detail below, optional post processing can be performed on the acyclic tree.

Figure 4:
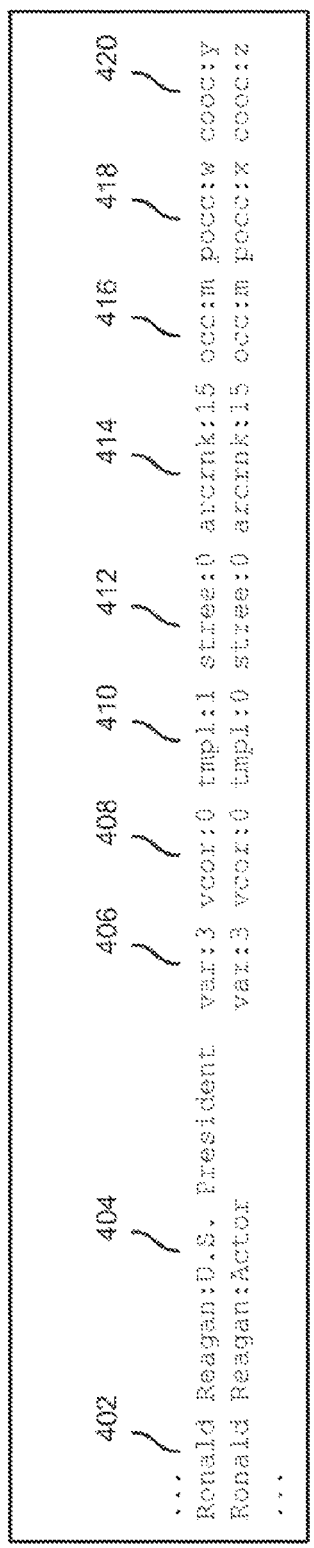
FIG. 4 illustrates an example of a vector of weights according to one embodiment.

FIG. 4 illustrates an example of a vector of weights according to one embodiment. Suppose that two arcs for the concept "Ronald Reagan" (402) are present in arc list 124. As mentioned previously, one portion of the process for constructing a DMST from a graph of directed arcs is to select one parent from among the candidate parents of a node. Generally if only one arc for a concept exists, that arc is used. If the candidate parent must be selected from multiple candidates, in some embodiments a pairwise lexicographical comparison is performed between the vectors of weights of those candidates. In the example shown in FIG. 4, the two candidate parents of "Ronald Reagan" are "U.S. President" and "Actor" (404). Indeed, Ronald Reagan was both a U.S. President and an actor, so the selection of either candidate would result in the preservation of the "is a" meaning between the node in column 402 and the node in column 404.

In various embodiments, some values included in the vector of weights are read in from files, and others are provided by additional processes (e.g., plugins) which calculate and provide scores. The first portion of the vector of weights to compare between the two candidates is the "variance" score, indicated in column 406. The variance score indicates the number of internal links which point to the candidate parent. Both candidate parents have a score of three, meaning that the vectors are tied, so the next portion of the vector is evaluated.

The next portion of the vector of weights to compare between the two candidates is the "vertical correction" score, indicated in column 408. In some embodiments the construction of a DMST is performed twice. The first time it is run, the vertical correction score is zero. The second time it is run, a vertical correction score is determined by a process that attempts to keep nodes that are peers grouped together under the same parent. For example, suppose that 95% of house plants are placed under "botany," but 5% select as best parents "health" on the first run. The vertical correction process is configured to detect the discrepancy and will indicate that a "botany" parent should be selected by returning a nonzero score in column 408 (such as a Boolean value) during the second run. In various embodiments, normalization and/or a threshold is applied so that in cases such as a 60/40 split, the vertical correction process does not attempt to group peers under the same parent. In the example shown, both candidates have a score of zero. The vectors are tied, so the next portion of the vector is evaluated.

The next portion of the vector of weights to compare between the two candidates is the "templates" score, indicated in column 410. The value for the templates score is provided by a process that evaluates nodes against groups or lists of concepts and attempts to keep those groups together. If concepts are present in multiple groups, the process attempts to keep the most number of groups, or the most important groups together, etc., as applicable. The lists/groups may be provided by a third party and/or configured by an administrator or otherwise obtained. For example, Wikipedia provides set information for certain entries which can be scraped by crawler 104. Examples of groups include a list of the planets in the solar system, a list of human diseases, a list of the seven dwarves, British Commonwealth countries, etc. In the example shown, Ronald Reagan appears in a list of United States presidents. As such, a score of one is present in column 410 for "U.S. President" but not for "Actor." Since there is no longer a tie between the two vectors, "U.S. President" would be selected as the best parent for the concept "Ronald Reagan." If both values in column 410 were equal, however, the next portion of the vector would be evaluated, and so on, until the tie was broken. In the example shown, the remaining columns are as follows. Column 412 reports whether a process evaluating the loaded subtree preferences list 132 has determined that a positive or negative preference exists for the arc. If no such preference is found, column 412 reports a zero. If a preference is found, it is indicated in some embodiments as a positive or negative value. Column 414 is the arc rank score described previously.

Columns 416, 418, and 420 report various statistics about the presence of the concept and its candidate parent within the documents stored in index 106.

The "occ" column (416) includes a score that represents a frequency count for the concept. A frequency count indicates the frequency of the occurrence of the concept within the pages in index 106. The frequency count is determined in some embodiments by crawler 104 using vertex list 126 to scan through each of the documents in index 106 and increment the "occ" for the concept for each page in the index that includes at least one occurrence of the concept. The "pocc" column similarly represents a frequency count for the candidate parent.

The "cooc" column includes a score that represents the cooccurrence of the concept and candidate parent in the pages in index 106. Cooccurrence scores are determined in some embodiments by crawler 104 evaluating the cooccurrence of concepts which are connected by an arc (e.g., are present in arc list 124). Techniques such as using a running window of words can also be employed to avoid quadratic blowup.

Figure 5:
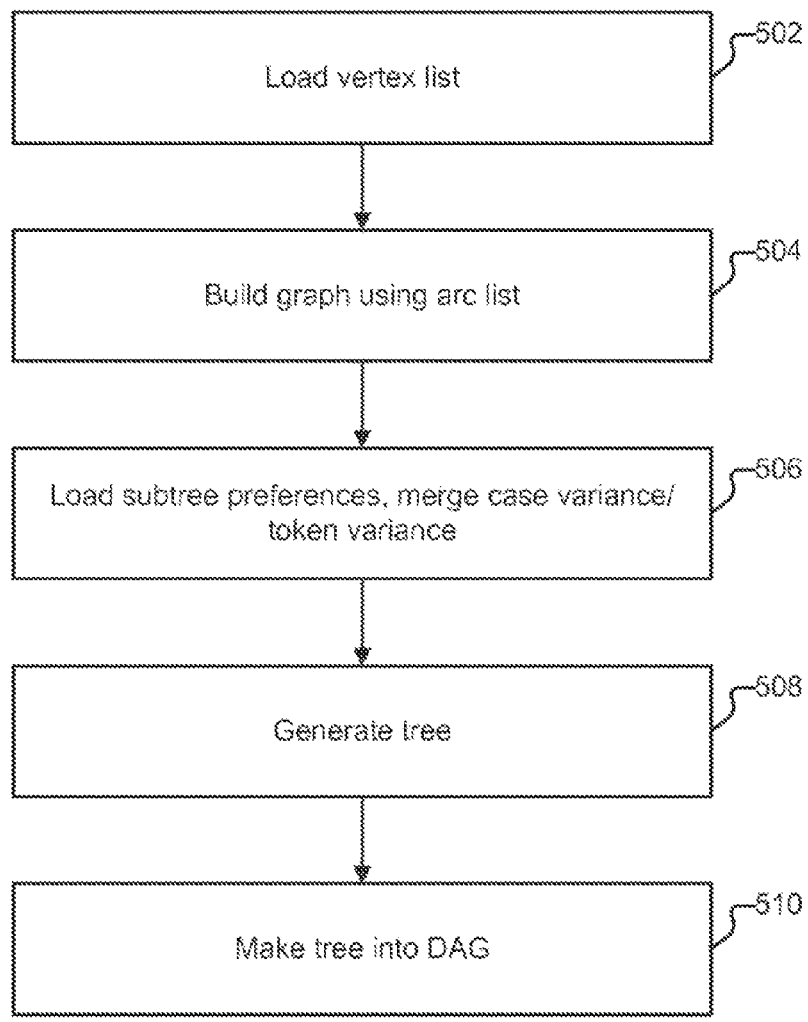
FIG. 5 is a flow chart illustrating an embodiment of a process for creating a hierarchy of concepts from a corpus of documents.

FIG. 5 is a flow chart illustrating an embodiment of a process for creating a hierarchy of concepts from a corpus of documents. In some embodiments the process shown in FIG. 5 is performed by hierarchy builder 130.

The process begins at 502 when vertex list 126 is loaded, allowing hierarchy builder 130 to map concept names (e.g. human readable concept names) to concept IDs. At 504, a graph is built using arc list 124—for example by connecting pairs of concepts together and storing any associated properties. If duplicate arcs are encountered, the properties of the duplicate arcs are merged. For example, if one line in arc list 124 reads Physics:Science:20 and another line in arc list 124 reads Physics:Science:10, the arcs are "merged" with the best weight being preserved (e.g., Physics:Science:10). If one source indicates that an arc is a homonym arc, and another source indicates that the arc is a synonym arc, the arcs are merged and both flags are set for the merged arc. At 506 subtree preferences list 132 is loaded, as are any applicable case variance or tokenization variance information.

At 508, a DMST is constructed. First a best parent is selected for each node by performing a local decision comparing vectors of weights. Next, cycles are detected. One way of detecting cycles is to traverse the graph, marking each node as "seen" as it is visited. If a node is reached again during the traversal, a cycle has been located. For each cycle, an evaluation is made between the cost of removing an arc and the cost of adding an incident arc, and selecting the appropriate arcs whose addition/removal have the lowest associated cost. In some embodiments the comparison is a difference of vectors, and is computed by replacing the values in the vectors with minwise elements. As stated previously, the selection of a single parent, the detection of cycles, and the reduction of cycles continues until each node (except the root) has exactly one parent. In some embodiments post processing is performed, such as vertical correction.

At 510 the DMST is extended to a DAG using additional arcs. For example, at 510 synonym arcs are inserted into the DMST, as are homonym arcs, so long as acyclicity is preserved. In some cases, additional concept arcs are included in the DAG where doing so would not result in the formation of a cycle. For example, including "Actor" as a second parent of "Ronald Reagan" will not result in a cycle and will preserve the "is a" relationship up the hierarchy. However, the insertion of other arcs (not previously shown) such as between "Ronald Reagan" and "Hollywood Walk of Frame" might be inappropriate, e.g. because the "is a"/containing relation would be skewed away (e.g. if the parent of "Hollywood Walk of Frame" is "Landmarks"—Ronald Reagan is not a Landmark). One way of inserting additional arcs into the DMST is to first globally rank the omitted arcs. Rules can be used such as that additional arcs will be inserted into the DAG, in the globally ranked order, so long as the arc to be inserted is of a smaller depth than the existing single parent for the node, or that arcs can be inserted within the same vertical but only one additional arc may be added into a different vertical from the existing single parent, or that additional arcs must have a threshold cooccurrence score before they are placed into the DAG.

In some embodiments at least some orphan nodes are placed back into the DMST at 510. One way of placing orphans is to perform a search using the orphan as an input to the query categorization techniques described in more detail below. If the results are sufficiently dense, the orphan can be placed in the appropriate place in the DAG. Similarly, the hierarchy of concepts can be expanded by crawling the documents 108 for word n-grams and also attempting to place them into the DAG by using the word n-grams as an input to the query categorization techniques described in more detail below.

Figure 6:
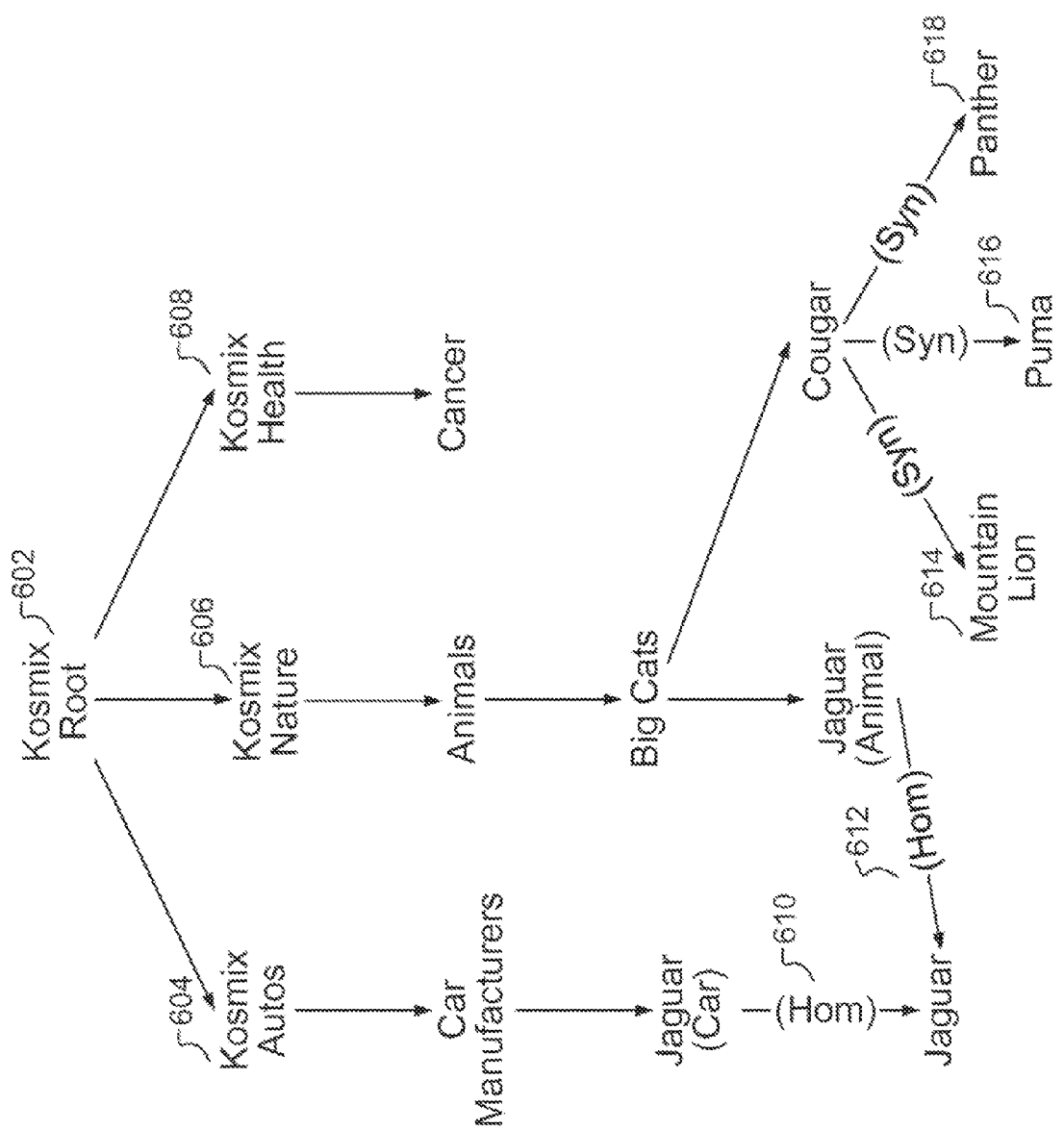
FIG. 6 illustrates an example of a portion of a concept hierarchy.

FIG. 6 illustrates an example of a portion of a concept hierarchy. The example shown is an example of a portion of a DAG created using the process shown in FIG. 5. At the root of the hierarchy is a root node 602. Assorted verticals 604-608 have a containing relation to their respective children. For example, Kosmix Autos contains Car Manufacturers which contains the Jaguar automobile manufacturer. Homonym arcs 610 and 612 exist between the ambiguous term, Jaguar, to two of the disambiguated meanings of the concept. Synonym arcs 614-618 exist between the main instance of the concept "Cougar" and assorted synonyms for the concept.

Tagging Documents with Concepts

Figure 7:
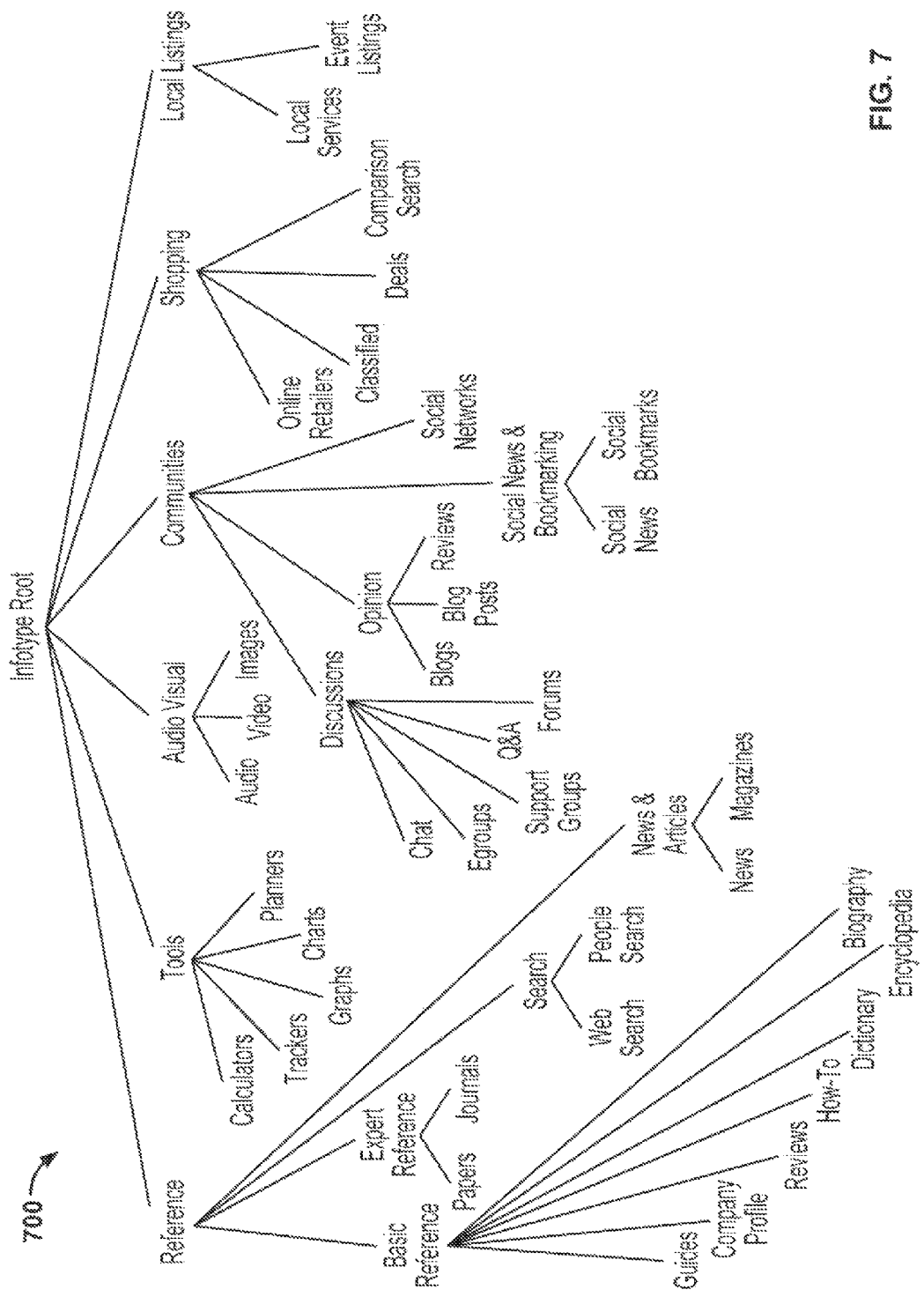
FIG. 7 illustrates an example of a hierarchy of information types according to some embodiments.

FIG. 7 illustrates an example of a hierarchy of information types according to some embodiments. Both the hierarchy of subject type concepts 128 constructed by hierarchy builder 130 (or received, for example from a third party such as by using the Open Directory) and a hierarchy of infotypes such as is shown in FIG. 7 can be used to tag the documents stored in index 106 using a variety of techniques.

One way of tagging a document in index 106 with subject type concepts is as follows. For each concept in vertex list 126, use the concept as a search query against the documents in index 106. Evaluate the results using standard text match and link scoring techniques (e.g., by examining the number of occurrences of the query on the page, the page title, the link text, metadata, whether the concept appears in bold, etc). Such techniques, which measure how well the text of a query matches a document are collectively referred to herein as "text match scoring" techniques producing "text match scores" although more than just the text of the document may be evaluated by such techniques.

For any particular page, the concept (query) which results in the highest text match score for the page is that page's top concept. The concept which results in the second highest text match score for the page is that page's second concept, etc. Any given document may include thousands of concepts from vertex list 126. Thus in some embodiments a threshold is applied and the document is tagged with its resulting top n concepts, such as the top 30 concepts.

Websites typically have common elements across the various pages that are included in that site. For example, a news website may include a left or right navigational section that includes the terms, "Health," "Finance," "World News," etc. The site may also include a prominent logo on every page. In some embodiments such common elements are identified and ignored or stripped during indexing so that text match scores are not skewed by the prolific presence of those common elements. Identifying and ignoring or stripping common elements allows text match scores and infotype rules to be applied specifically to the distinct content of each document.

One way of tagging a document in index 106 with an infotype is to determine whether any rules associated with those infotypes is satisfied by the document. For example, documents hosted by a known image hosting service (e.g., stock-photo library), or having an image with a certain minimum pixel size may be indicative of an image type document (e.g., a document having one or more informative images), and be tagged as having an infotype "images." Conversely, documents with discouraging ALT text (e.g., "advertisement"), a standard advertisement size or location, and generic filenames suggestive of being merely decorative or formatting elements (e.g., "pixel.gif", "footer.jpg") indicate that while including an image, the document is unlikely to be of interest to a user seeking images and are not tagged with the "images" infotype.

Documents hosted by a known news site (e.g., www.wsj.com), having a title indicative of a news source (e.g., "Breaking News"), or including a copyright notice from a known news agency/newswire (e.g., "Associated Press") are tagged as being of infotype news. Documents with a title that includes words such as "event," "calendar," "upcoming," etc., are tagged with the "events" infotype. Documents that include terms specific to categories of local venues (e.g., amusement parks, toy stores, police stations, That restaurants, dentists) or including links to map services are tagged with the "local" infotype. Documents that include terms (e.g., appearing on a wordlist) such as "add to cart," "coupon," and "checkout" are tagged with a "shopping" infotype, etc.

If multiple rules for different infotypes are satisfied by a document, the document is tagged with multiple infotypes as applicable. For example, a photojournalist's blog about current events might be tagged with both the "images" and the "news" infotypes.

The top concepts for a document are stored in index 106 and are used in a variety of ways, as described in more detail below.

Lighting Concepts

Figure 8:
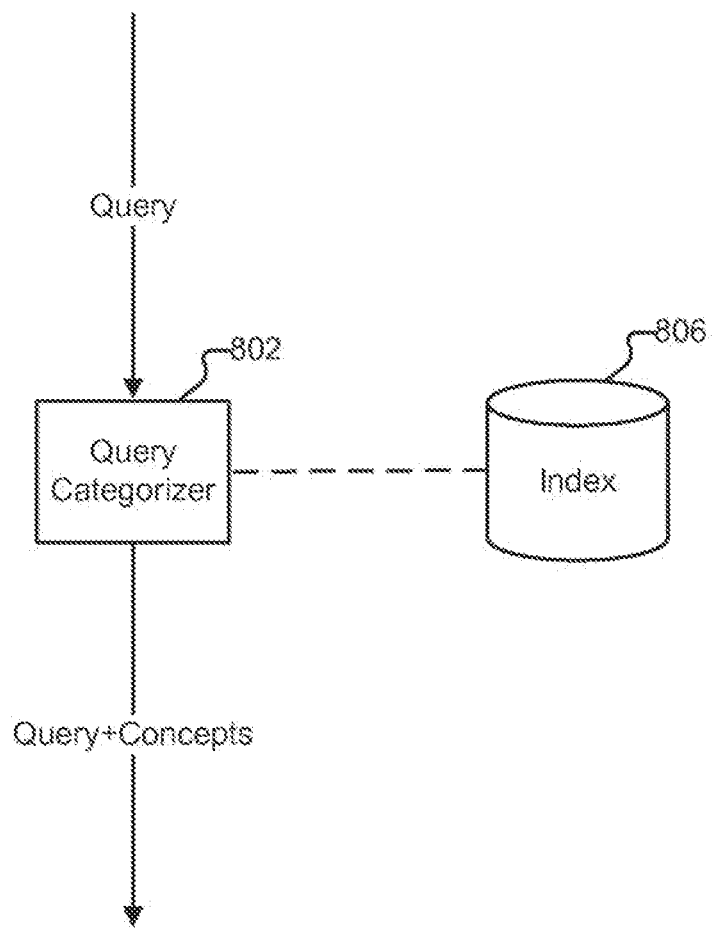
FIG. 8 illustrates an example of a system for categorizing a query.

FIG. 8 illustrates an example of a system for categorizing a query. In some embodiments index 806 is index 106. Query categorizer 802 receives queries as input. While only one query categorizer is shown in FIG. 8, in some embodiments multiple query categorizers may be included in the system (and operate on slices of the index) so that many queries can be received and processed simultaneously, such as when query categorizer 802 is used in conjunction with a user-facing search engine, or when processing orphans received from hierarchy builder 130. As described in more detail below, query categorizer 802 consults information stored in index 806 to determine a list of one or more concepts associated with the received query. The output of query categorizer 802 is used in some embodiments as an input to additional processing, also as described in more detail below.

Figure 9:
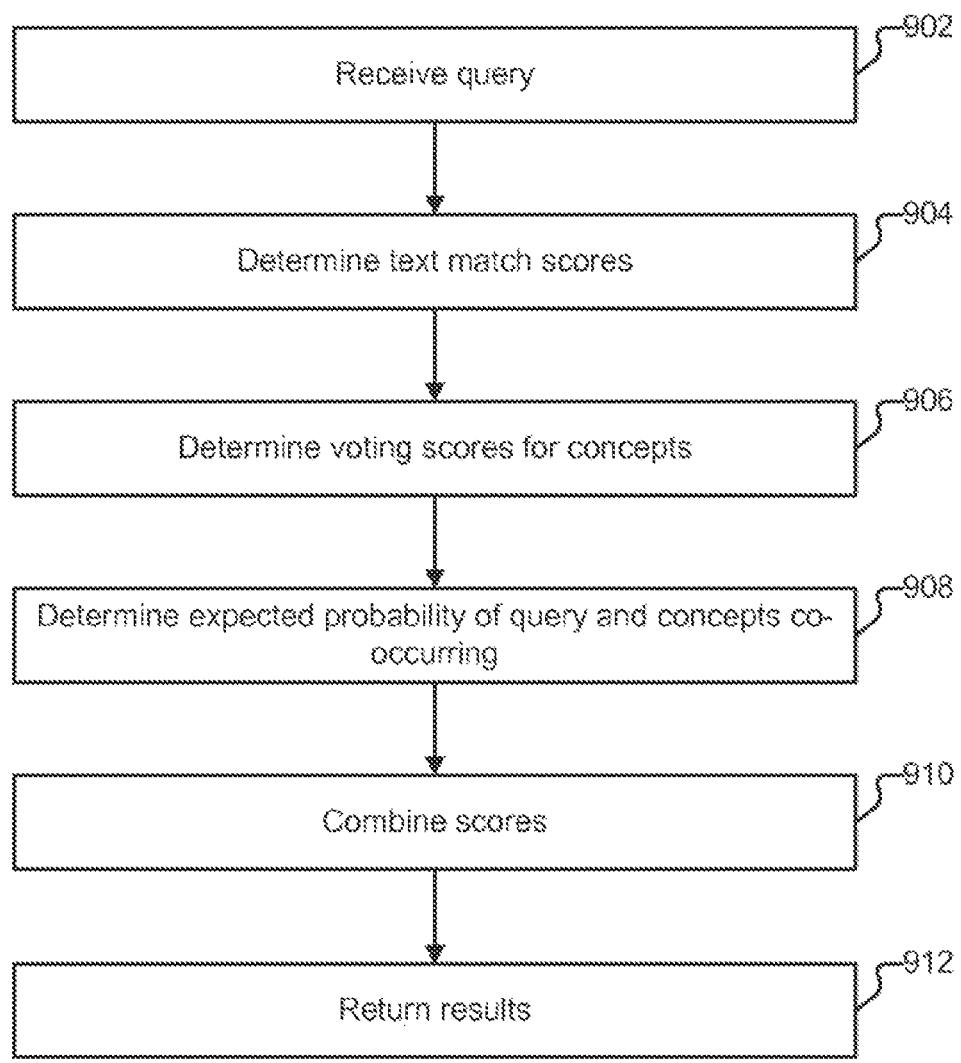
FIG. 9 illustrates an example of a process for categorizing a query.

FIG. 9 illustrates an example of a process for categorizing a query. In some embodiments the process shown in FIG. 9 is performed by query categorizer 802. The process begins at 902 when a query is received. At 904, a search of an index, such as index 806 is performed, using the received query and text match scores that are received for the results. In some embodiments a PageRank score is computed as part of the text match score determination. Other scoring techniques may also be used.

Suppose there are 20,000 documents stored in index 806 and that the query received at 902 is "What kind of metal is the Eiffel Tower made out of?" Of the 20,000 documents, suppose 350 results are found. The first result is the best match (e.g., one describing the history of the construction of the Eiffel Tower and containing many instances of the query) and the $350^{th}$ result is the worst result (e.g., containing all of the words of the query, but with those words appearing in disjoint areas of the document instead of next to one another). Each of the 350 results corresponds with a document stored in index 806. If the documents stored in index 806 have been tagged with concepts, such as by using the techniques described herein, then each of the 350 results also has an associated set of concepts.

At 906, the query results and the concept information stored about the results in index 806 are combined to determine a set of scores for concepts (a process referred to herein as "voting"). One technique for determining voting scores is as follows. First, examine each result and obtain a list of all of the top concepts reflected in the results. (E.g., take a union of all of the concepts tagged to all of the results.) Next, for each concept in the union (also referred to herein as the "candidate concepts" list), assign that concept a score equal to the sum of the text match scores of each of the documents in the results which includes the concept in its list of top concepts. In some embodiments the text match scores are normalized. Suppose, for example, that only the top 100 results are used (and the remaining 250 results are discarded). The best result is assigned a score of 1. Each of that result's top concepts (e.g., topics T1, T5, and T20) receives a score of 1 from the result. Suppose that the next best result is assigned a score of 0.99. Each of that result's top concepts (e.g., topics T1, T2, and T3) receives a score of 0.99 from that result, and so on. After evaluating the first two results, topic T1 has a score of 1.99, topics T2 and T3 have a score of 0.99, and topics T5 and T20 have a score of 1. In some embodiments the voting scores are not weighted, but instead each concept receives one count for every result that listed that concept as one of its top concepts. Other voting techniques can also be used as applicable.

At 908, for each concept (e.g., the candidate concepts) the expected number of documents that the query and the concept would occur in at random is determined. This is referred to as an "expected cooccurrence" and is computed as follows in some embodiments. The probability of the cooccurrence of the query and the concept is equal to the probability of the query occurring multiplied by the probability of the concept occurring. This can be expressed as:

$$P(\text{query and concept}) = \frac{QueryDF}{IndexSize} \times \frac{ConceptDF}{IndexSize}.$$

The "QueryDF" is the number of documents in the index in which the query appears, and the "ConceptDF" is the number of documents in the index which are tagged with the concept. The expected cooccurrence is IndexSize×P(query and concept). The expected cooccurrence is then compared to the observed cooccurrence. If the observed cooccurrence exceeds the expected cooccurrence by a threshold amount, the concept is referred to as having been "lit"—the query is potentially related to the lit concept.

At 910, the various scores are combined into a combination score. In some embodiments at 910, logistic regression is used to determine how to combine, for a given concept, the text match scores, voting scores, expected cooccurrence scores, and the actual number of documents that the query was matched with and the concept occurred in (the "observed cooccurrence"). Other techniques may also be used to determine the best coefficients and/or to combine the scores. For example, coefficients can be added, some multiplied and others added, and powers can also be used.

At 912, results, such as an ordered list of all of the candidate concepts is returned. In some embodiments additional processing is performed. For example, a threshold may be applied such that only the most highly scored n concepts are returned, or only the highest concept is returned. A confidence score may also be computed. For example, of all of the candidate concepts, their respective combination scores may be normalized, and the concepts may be assigned into buckets such as "high confidence," "medium confidence," and "low confidence" based on their normalized scores.

The process shown in FIG. 9 can be adapted to determine a list of infotype concepts in addition to or instead of a list of subject type concepts associated with the query. For example, at 906, in addition to voting for the subject type concepts, a document can also vote for the infotypes with which it is associated and the highest scoring infotypes can also be returned at 912 as applicable.

FIG. 10 illustrates an example of scores determined as part of a process for associating a query with a concept. In some embodiments the scores shown in FIG. 10 are computed as part of the process shown in FIG. 9. Suppose index 806 includes 400 million documents, that a user has provided as a query the word "jaguar," and that 34898 results are obtained (i.e., the QueryDF is 34898). Column 1002 lists assorted concepts with which documents in the index that are results of a "jaguar" query are tagged. The concepts are sorted according to their "final score" (1004). In the example shown, the final score is a combined score such as the one computed at 910 in the process shown in FIG. 9. The combination function used in this example is:

$$c_1 \times \log(TextScore) + c_2 \times \log(ExpectedCoOccurrence) + c_3 \times \log(ObservedCoOccurrence) + c_4 \times \log\left(\frac{TextScore}{MaxTextScore}\right),$$

where the TextScore is an average of the text match scores given to the top 100 documents that matched the query, and where the MaxTextScore is the highest text score that any concept received for the query. The constraints $c_1$, $c_2$, $c_3$, and $c_4$ were selected by running logistic regression on a set of 100 queries and their matched concepts. The values used in the example shown are $c_1=2.0151$, $c_2=-1.2769$, $c_3=1.1504$, and $c_4=0.51$. The constraints can be manually adjusted as applicable.

Column 1006 lists the TextScores of the respective concepts. Column 1008 lists the observed cooccurrence of the concept and the query, column 1010 lists the Concept DF, and column 1012 lists the expected cooccurrence of the concept and the query. Column 1014 is a confidence score, computed by using a hard threshold on the final score. In the example shown, a final score above 2300 is assigned a confidence of 10, a final score above 2200 is assigned a confidence of 9, a final score above 2100 is assigned a confidence of 8, etc. Concepts with final scores equivalent to a confidence of 0 (less than 1500) are automatically removed.

In the example shown, the three top concepts for the query "jaguar" are the automobile (1020), the mammal (1022), and the sports team (1024). They each have a high confidence score. Other concepts, such as a specific model of automobile (1026), and a player on the sports team (1028) also have high confidence scores. As the confidence scores diminish, the corresponding concepts appear to be less directly relevant to a query of "jaguar" but remain clumped within one of the three main meanings. For example, concepts 1030, 1038, 1040, 1046, and 1062 are each related to the notion of "jaguar" being the sports team. Concepts 1032, 1034, 1036, 1042, 1044, 1048, 1050, 1056, 1058, 1060, and 1064 are each related to the notion of "jaguar" being the automobile. In some embodiments the related concepts are clumped within different meanings as follows. First a list of contexts is obtained, such as by using concepts which have high confidence and have homonym parents. Homonym parents are the different meanings of that concept. A list of the homonyms is a list of all possible meanings of the query. Each concept is then said to be in the context of the homonym nearest to it in the DAG.

Figure 11:
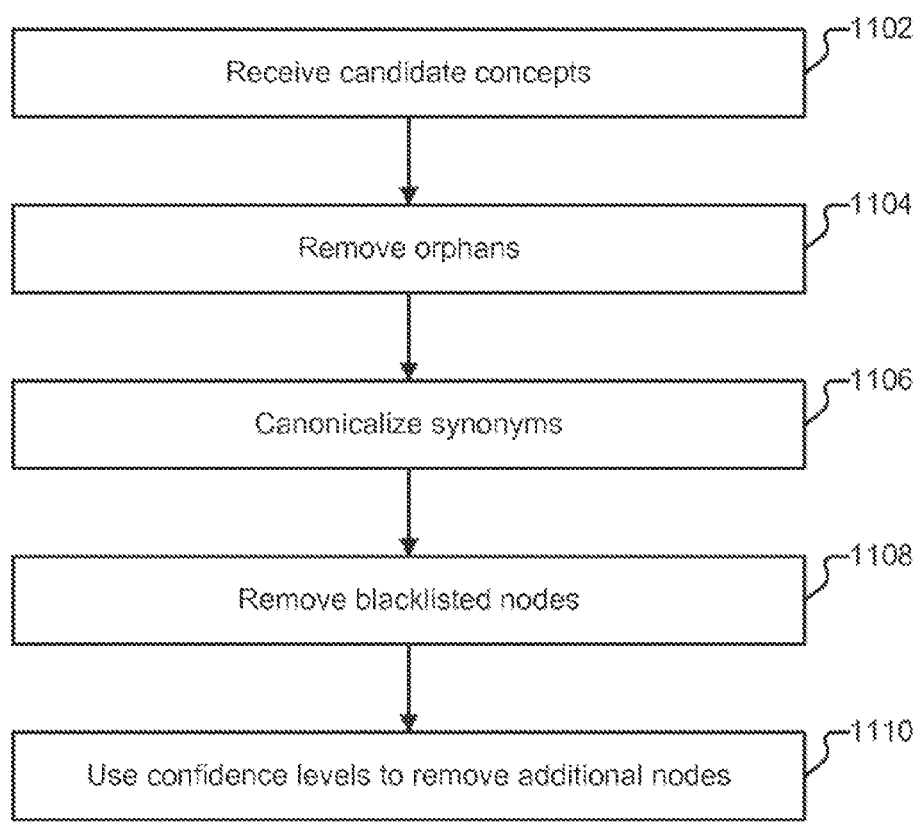
FIG. 11 illustrates an example of a process for cleaning concepts.

FIG. 11 illustrates an example of a process for cleaning concepts. In some embodiments the process shown in FIG. 11 is performed by query categorizer 802. The process begins at 1102 when a list of concepts and associated scores is received. In various embodiments the processing shown in FIG. 11 is performed in conjunction with the processing shown in FIG. 9. For example, the processing of FIG. 9 can be completed (resulting in a list of candidate concepts and their respective scores) and the output of that process used as input at 1102. The processing shown in FIGS. 9 and 11 can also be interleaved and redundant or unnecessary steps are omitted as applicable. For example, orphan removal may occur prior to the determination of a final score.

At 1104, any candidate concepts that are not also present in concept hierarchy 128 are removed. This is known as orphan removal. At 1106, synonyms are resolved to their canonical concepts. In the hierarchy shown in FIG. 6, "cougar" is the canonical concept for synonyms "mountain lion," "puma," and "panther." The synonyms are replaced by their canonical concept and the canonical concept receives the highest score of any of its synonyms. For example, in FIG. 10, litre (1042) and liter (1060) are synonyms. During synonym resolution, these two concepts would be combined, taking on the final score of "litre" which is the highest. At 1108, blacklist concepts are removed. Examples of blacklist concepts include spam, pornography, or other portions of the hierarchy that a person has manually blacklisted. At 1110, additional concepts are removed based on their confidence levels and location in hierarchy 128. Concepts without a sufficient number of supporting concepts in the same area of the graph are removed. One way of removing these outlier concepts is as follows. Concepts with a confidence level of 10 are not removed. For concepts with a confidence level of 9, examine whether the ancestors of that concept (up to 9 levels away) have any children that are also candidate concepts. If not, the concept is removed. For concepts with a confidence level of 8, examine whether the ancestors (up to 8 levels away) have any children that are also candidate concepts. If not the concept is removed, and so on. In some embodiments additional processing is performed, such as by automatically resolving certain kinds of ambiguities and identifying ambiguous queries that cannot be automatically resolved, and by automatically grouping candidate concepts under their parents.

Figure 12:
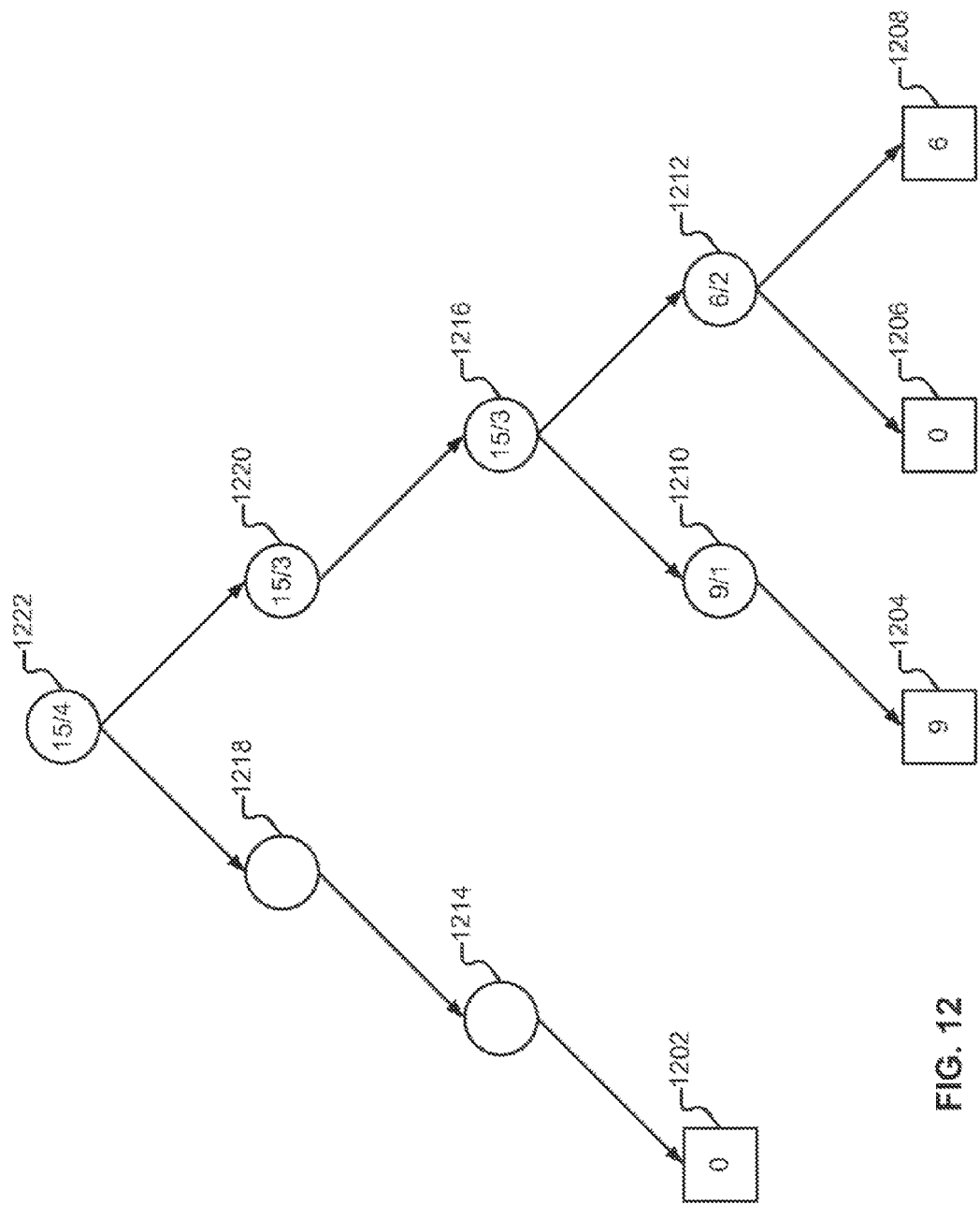
FIG. 12 illustrates an example of a concept hierarchy and scores associated with a query.

FIG. 12 illustrates an example of a concept hierarchy and scores associated with a query. In the example shown, the concept hierarchy includes 11 concepts. Nodes 1202, 1204, 1206, and 1208 are leaf nodes—they do not have any children and are represented by squares. In the example shown, the numbers inside each of the leaf node boxes is an "affinity score"—a measure of how closely the concept matched the query. In some embodiments the affinity score is the normalized combination score as determined using the techniques described above. In the example shown, concepts 1202 and 1206 did not match the query (i.e., no documents tagged with concept 1202 or 1206 matched the query, or the matches were of very poor quality) and thus have no score. Concept 1204 received a score of 9 and concept 1208 received a score of 6.

As described in more detail below, scores can be assigned to concepts which did not match the query in a variety of ways. For example, a relation can be determined between a summation of the affinity scores of the children under a parent, and the number of paths that can be taken from the parent to its children and used as a measure of how well the query matched that parent concept. A score determined in such a manner is referred to herein as a "density score." A density function is any function that relates node scores and some kind of volume, such as the number of children (or leaf level concepts), under a parent. Affinity scores need not be combination scores. For example, in some embodiments the density function uses as a node score a "1" for any leaf node that was determined to have matched the query and a zero for all other leaf nodes.

In the example shown, the density score of node 1212 is 3. Node 1208 contributes 6 points, while node 1206 does not contribute any. There are a total of two paths which can be taken from node 1212 to the leaf level. The density score of node 1210 is 9, like its child node 1204. The density score of node 1216 is 5. The density score of node 1220 is also 5, because while it is one level higher in the hierarchy, it has only one child (and thus has the same number of paths available as that child). The scores of nodes 1214 and 1218 are undefined because the score of node 1202 is 0. The score of node 1222 is 3.75.

Figure 13:
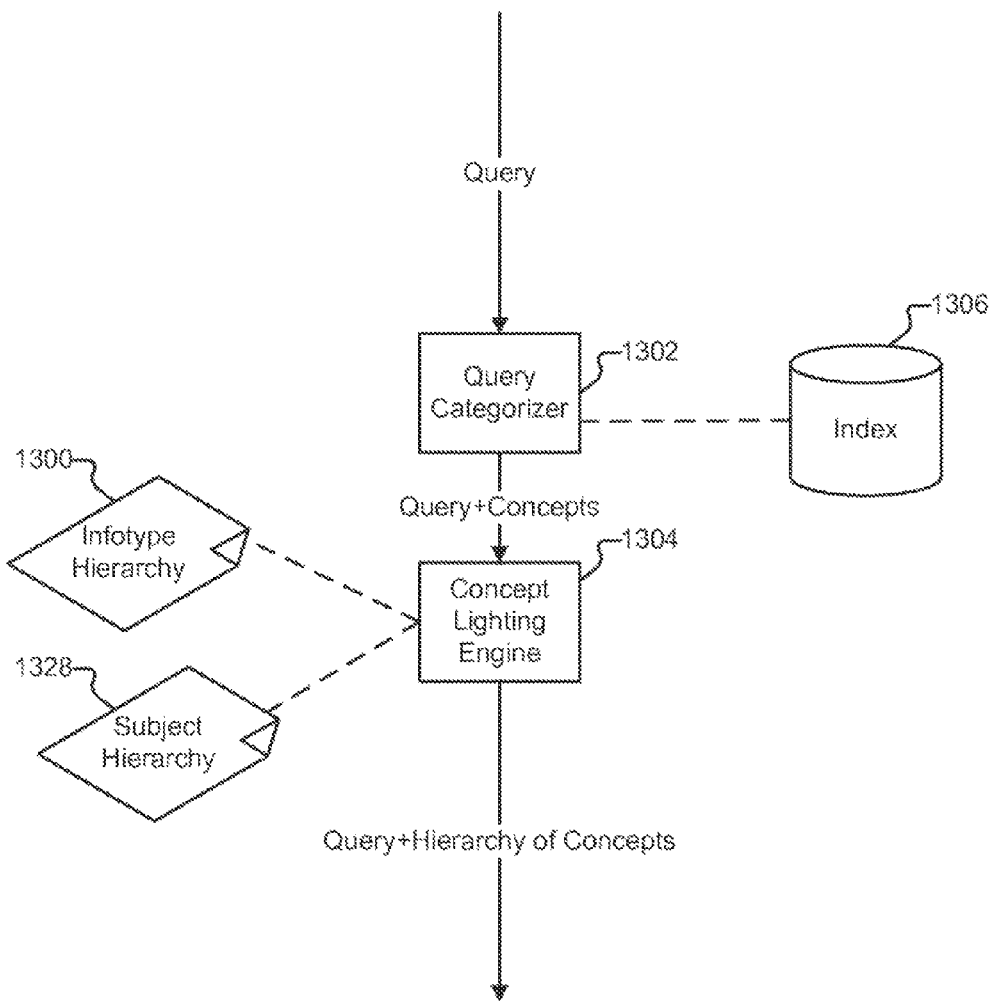
FIG. 13 illustrates an example of a system for categorizing a query.

FIG. 13 illustrates an example of a system for categorizing a query. In some embodiments index 1306 is index 106, subject hierarchy 1328 is hierarchy 128, infotype hierarchy 1300 is infotype hierarchy 700, and query categorizer 1302 is query categorizer 802.

In the example shown, query categorizer 1302 receives a query and determines a set of candidate concepts. Query categorizer 1302 provides the query and the candidate concepts to concept lighting engine 1304. Concept lighting engine 1304 is configured to use a density function to evaluate the received candidate concepts and return as output the received query and a set of concepts that are associated with the query. In some embodiments the concepts output by concept lighting engine 1304 are returned in a hierarchy form—a subportion of infotype hierarchy 1300 or subject hierarchy 1328 that includes only the candidate concepts selected by concept lighting engine 1304.

Figure 14:
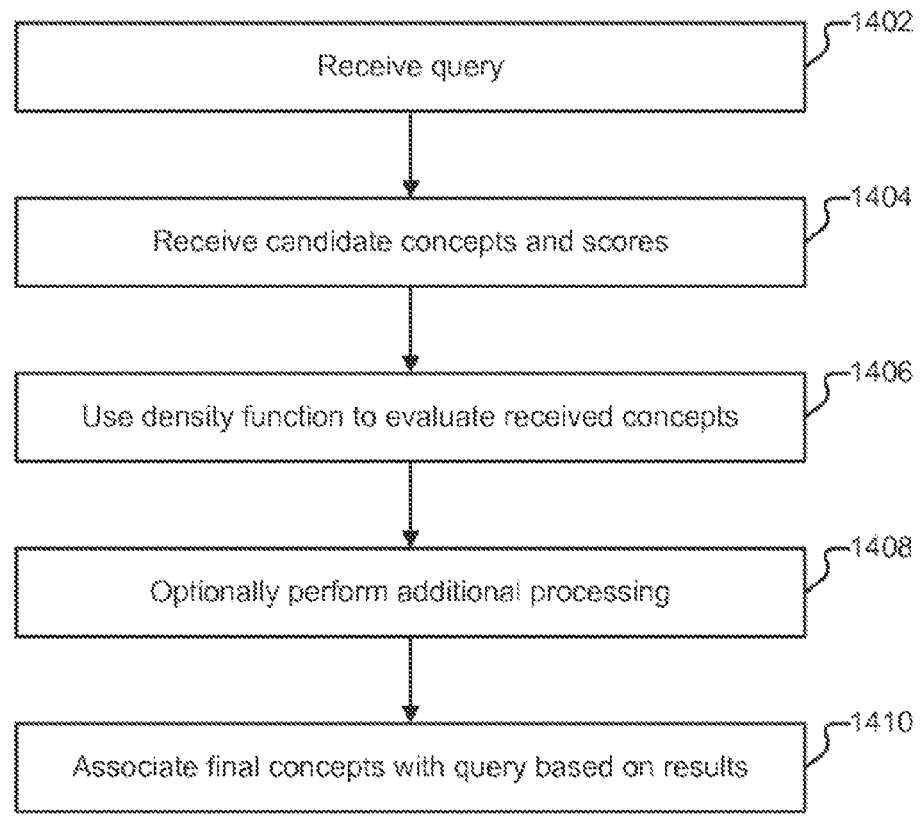
FIG. 14 illustrates an example of a process for categorizing a query.

FIG. 14 illustrates an example of a process for categorizing a query. In some embodiments the process shown in FIG. 14 is performed by concept lighting engine 1304. The process begins at 1402 when a query is received. For example, at 1402 a query is received from query categorizer 1302. At 1404 candidate concepts and scores are received. In some embodiments the query, candidate concepts, and scores, are received simultaneously at 1402 and portion 1404 of the process is omitted. At 1406 a density function is used to evaluate the received candidate concepts. At 1408, additional processing is optionally performed, as described in more detail below. At 1410 one or more final concepts are associated with the query. Using the information shown in FIG. 10, "concept1=jaguar_car, concept2=jaguar_animal, concept3=jacksonville_jaguars" is an example of what might be returned at 1410. In some embodiments the query and final concepts are provided to a system which automatically selects an appropriate page layout and page elements based on a query, which is described in more detail below.

Figure 15:
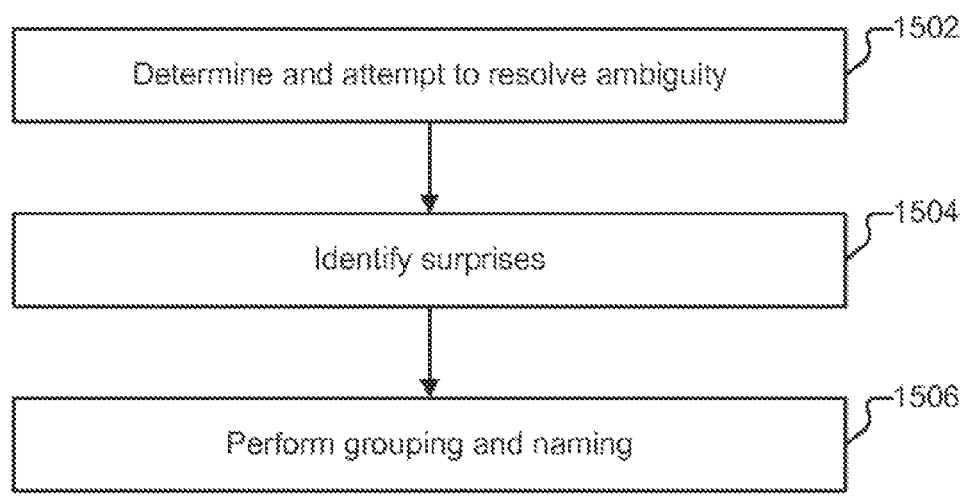
FIG. 15 illustrates an example of a portion of a process for categorizing a query.

FIG. 15 illustrates an example of a portion of a process for categorizing a query. Portions 1502-1506 are examples of optional processing that can be performed to further refine the categories associated with the received query. For example, at 1502 ambiguity is evaluated and an attempt is made to autodisambiguate any detected ambiguities. One form of ambiguity is vertical ambiguity. A vertical is a top level concept, such as "Health" or "Travel" that has as a direct parent the root concept. One way of determining vertical ambiguity is to determine the density scores concentrated under each vertical. If one vertical has a density score that is considerably higher than the other verticals, the query is not ambiguous at a vertical level. For example, a query of "buy plane tickets" is likely to have a high density score within the "Travel" vertical but have low density scores in the other verticals. If multiple verticals light, but one is considerably denser (i.e., the density scores of its nodes is higher) than the other verticals, in some embodiments the concepts in the less dense verticals are removed and only the most dense result is returned. This process is referred to herein as autodisambiguation.

If multiple verticals have similar density scores, then the query is likely to be ambiguous at the vertical level and cannot be resolved without further input, such as from the user. For example, the query "jaguar" is likely to have comparable density scores under the "Sports," "Nature," and "Transportation" verticals. If the user provides a query such as "lease a jaguar," the "Transportation" vertical is most likely the user's intent. In some embodiments the final concepts returned at 1410 include an indication of whether an ambiguity was detected and if so, what are each of the disambiguated meanings of the query.

Lower ambiguity (within a vertical) can also be determined. One way of determining lower ambiguity is, for any node in the tree, to determine the density of its children. For example, suppose a node has ten children. The density scores of each of the ten children are compared. If the density scores of some children are considerably different from the density scores of other children, then the query can be said to be ambiguous at the level of the node being evaluated. In some embodiments if a threshold number of children (e.g., 90% as opposed to 50%) have similar scores, then the query is not considered to be ambiguous at the level of the node being evaluated.

Another technique for determining ambiguity is as follows. A list of contexts is determined by taking all homonyms of all high confidence concepts. All nodes in the DAG are marked with their nearest context. For each context, a parent node is determined. In some embodiments this is done by taking the highest node that has, as descendents, only nodes from within this context. Only one such node will exist because the homonym which provides the context follows only one path upwards (the tree path). The density of these representative parent nodes are compared and if the densities are similar in more than one context the query is ambiguous in those contexts, else its non ambiguous and belongs in the context with the highest density.

Typically, ambiguity that occurs across verticals or contexts indicates that the query has at least two different fundamental meanings, such as jaguar as a mammal and jaguar as an automobile. When ambiguity occurs within a vertical (e.g., a parent node has two dense children and several sparse children), one possible cause is that the query is not ambiguous, but only implicates certain children. For example, suppose a query lights "India" and "France" under a "Countries" parent, but does not light other countries under the "Countries" parent. One reason for this is that India and France are both valid "answers," or matches to the query, while the other countries are not.

In some cases, a concentration of lights (i.e., dense areas) of a hierarchy does not imply an ambiguity but instead implies a surprise. Suppose a famous baseball player, "Johnny Stocks" was recently involved in a scandal involving the use of steroids. If a query of "Johnny Stocks" is performed, concepts such as "baseball," "Johnny Stocks," and the team to which Johnny Stocks belongs might light, each under the "Sports" vertical. Another concept that might also light is a "steroids" concept, which is located under a parent of "Pharmaceuticals" which is in turn located under the "Health" vertical. In this example, the lighting of the "steroids" concept is referred to as a "surprise." The steroids concept is consistent with the meaning of the other results (e.g., the concept of baseball) even though it is in a different vertical. One way of identifying surprises (e.g., at 1504) is as follows. If a node has a low affinity score, it is likely to be a mistake and is removed from the list of candidate concepts. A surprise, in contrast, has a high affinity score. Any identified surprises are returned in some embodiments at 1410 along with any selected final concepts.

At 1506, concepts are grouped and named. One way of grouping and naming concepts is to determine how broad a parent node is. If the parent has mostly dense children, the parent is used to name a group that includes all of its children. For example, if 80% of the children under the node "Actors" light, in some embodiments the "Actors" node is selected as a concept to be associated with the query, e.g. at 1410 in the process shown in FIG. 14. If, in contrast, only a few children light, the parent will not be used to group the child nodes, and each is associated with the query.

In some embodiments grouping is performed as follows. Starting with the level below root in the subtree that was lit up, the average entropy of the level is calculated as $$E = \sum \frac{(d_1 * \log(d_i))}{N},$$

where $d_i$ is the density of the $i^{th}$ node and N is the number of levels. A high entropy (e.g., above a threshold) implies that most nodes at this level have been equally lit up. For example, if most children of "Actors" light up equally, entropy will be high. This means these levels should be grouped together under the parent node. A low entropy (e.g., below a threshold) implies that only a few nodes have been lit up at this level and most others have not been lit. This indicates that those few nodes should be considered as candidates for grouping under. The average entropy of the children of these candidates is then computed. The candidates for which this entropy is high are used for grouping. If the entropy is low, the children in which the density was concentrated are added to the list of candidates.

Mashup of Dynamically Selected Components

Figure 16:
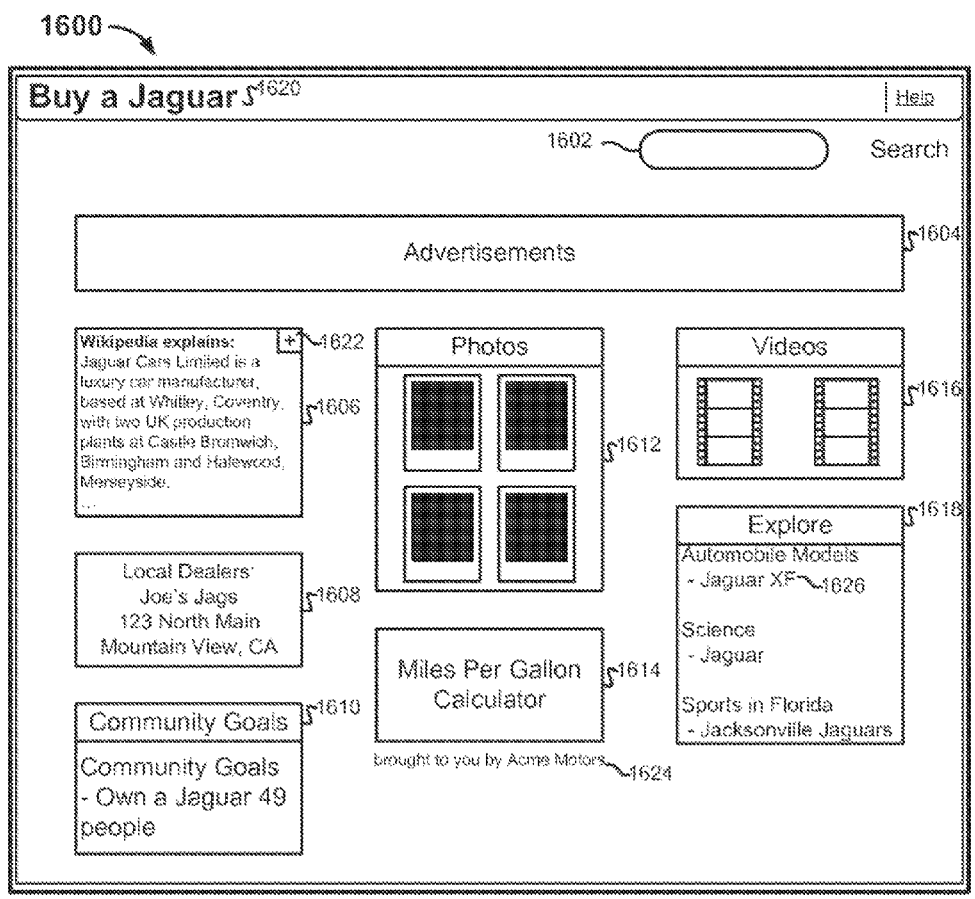
FIG. 16 illustrates an example of a page that includes dynamically selected components, as rendered in a browser.

FIG. 16 illustrates an example of a page that includes dynamically selected components, as rendered in a browser. In the example shown, a user has entered the phrase, "buy a jaguar," into a search area (1602) of an interface to a search engine. As described in more detail below, the user's query is categorized, such as by the system shown in FIG. 13 and components to be displayed to the user are selected based on the user's query and additional information (such as the concepts associated with the query). The components (also referred to herein as "modules" and "widgets") to be displayed are selected from among a pool of components and are selected and laid out on the page in accordance with a template specified by an administrator. A module is an atomic unit of content and can be provided by a third party.

The page template can be configured with query-agnostic formatting instructions, such as the number of columns to display, the relative width of those columns, and the percentage of the rendered page that is to be used for advertisements or other monetization-related modules. As described in more detail below, different templates can also be used based on factors such as the concepts with which the query is associated and whether a sponsor has requested that users be presented with a page that includes some kind of branding information. An administrator can use a template to govern whether any specific modules must be included in the rendered page (such as a section dedicated to traditional web results as provided by a particular search company), whether modules should be selected automatically from among a specific group of modules (e.g., that at least one calculator module be shown, but not more than two), whether modules should be selected automatically from the entire pool of available modules, and any additional constraints, such as that a logo must appear in a specific page location. A template can be used as a top-down filter that is used to control what is ultimately displayed on the page. Some additional examples of how modules can be selected and displayed include only showing a module if it has a quality greater than a particular threshold, showing a module in a specific location, etc. The page template can thus control the location, rank, whether to show or not to show a module, and can also customize the look of the module, such as its background color or title.

In the example shown in FIG. 16, an administrator has created a single template that is to be used for all queries, irrespective of the concepts associated with those queries. The template requires that the layout be in three columns, and that the title of the page (shown in region 1620) be taken from the query. Region 1604 of the page is a page block that is used to display advertisements. A page block is a portion of a page that includes rules governing the modules that can be placed within that block. A page block on a page can also specify a concept filter. A concept filter for a concept A indicates that only modules which have the concept A in their path to the root should be shown. Similar Boolean expressions can be used such as A and B or (C and D) where A, B, C, and D are concepts. Another example is the prohibition on more than two calculators could be implemented across the entire page, or the prohibition could only apply to a single page block. In the example shown, the administrator has specified that up to four advertisements may be displayed simultaneously in page block 1604.

The template specifies that a minimum of six modules and a maximum of ten modules be included in the page, but allows all of the modules to be chosen automatically using the techniques described herein and does not supply any additional constraints on the selection of those modules.

Modules 1606-1618 were automatically selected based on the "buy a jaguar query" provided by the user. Module 1606 provides a snippet of the main Wikipedia entry for "Jaguar Cars" and allows a user to access more of the article by selecting expand tab 1622. Module 1608 displays a list of local Jaguar dealers. If the user hovers a mouse over module 1608 a map is displayed of the location. If the user clicks on the address, the user is taken to the dealer's web page. In the example shown, "Mountain View, Calif." was determined to be the location of the user based on the user's IP address. In various embodiments, the user supplies demographic information, such as by configuring a profile or storing cookies that provide interface 1600 with geolocation and other information.

Module 1610 reports how many people have as a goal doing a particular task. In the example shown, the goal is "own a Jaguar," something which 49 individuals would like to do. The information shown in module 1610 is provided by an external source (e.g., a third party website) that makes available an API. Module 1612 displays photographs and module 1616 displays videos. Some modules, such as module 1610, receive as a parameter the query provided by the user in search box 1602. Other modules, such as a calculator widget that allows the user to perform assorted computations related to fuel economy (1614) is not passed any information. Static elements may also be included. As described in more detail below, some modules, such as photo module 1612 and video module 1616 are passed a modified version of the query (e.g., "jaguar car" instead of "buy a jaguar") so that the most relevant results can be presented to the user. Wikipedia module 1606 is passed a URL and a whole number. The URL specifies the Wikipedia page that the snippet is to be drawn from (e.g., "en.wikipedia.org/wiki/Jaguar_(car)") and the whole number specifies how long the snippet should be (e.g., 7 lines).

While the user's query, "buy a jaguar," could be considered an ambiguous one, the most likely intent of the user is not to purchase a mammal (or sports team). In the example shown, the user's query has been automatically disambiguated using the techniques described herein (e.g., by noting that the inclusion of the word "buy" in the query makes the query considerably more likely to be associated with the car concept than any other meaning of "jaguar"). Module 1618 provides the user with the ability to explore other concepts which it has determined to be of possible interest to the user. For example, by selecting link 1626, the user will be taken to an automatically generated page about the Jaguar XF. Thus, in addition to being generated in response to explicit user queries, a page such as is shown in FIG. 16 can be generated as the result of navigating to a particular concept in a concept hierarchy (and in such cases, the concept can be used as a "query" for purposes of the processes described herein).

Links to the homonyms of jaguar are also provided by module 1618 (e.g., in case the automatic disambiguation was incorrect). In some embodiments, whenever an ambiguous query is received, prior to being presented with any other modules, the user is first presented with module 1618 and asked to indicate which meaning of the ambiguous term is intended by the user. In other embodiments, a special disambiguation template is used in which each potential meaning of the query is dedicated a portion of the real estate on the page and the user may further refine his intent by, for example, selecting "show more results like this" or "hide this" links. In some embodiments the submission of ambiguous queries results in multiple pages, with a different page for each homonym opening in the user's browser.

In some embodiments module 1618 also provides a way for a user to refine his query by "and"ing additional concepts shown in box 1618 with the original query. For example, suppose a user entered a query of "insurance" in region 1602. One of the concepts shown in module 1618 might be "travel." By selecting an "and" button displayed next to the word travel, a new query may be provided to system 1700. Page 1600 would be updated so that the new page is configured to display modules relevant to "travel insurance." In some embodiments this technique is performed using vertical scoping—scoping which limits results to concepts below a certain parent.

Region 1624 is an example of a caption, as described in more detail below.

Figure 17:
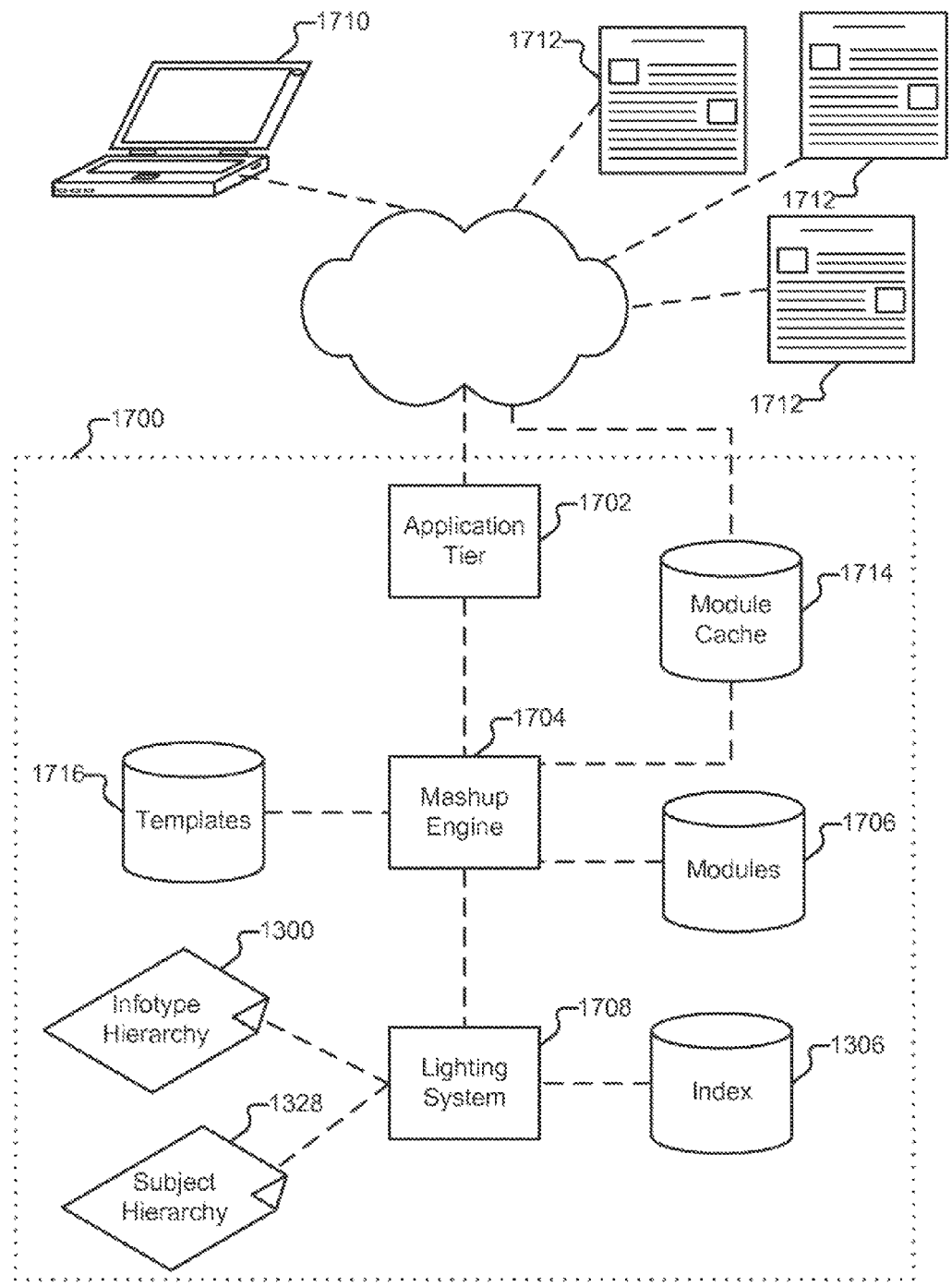
FIG. 17 illustrates an example of a system for delivering a page that includes a plurality of modules.

FIG. 17 illustrates an example of a system for delivering a page that includes a plurality of modules. In the example shown, client 1710 provides a query to system 1700, such as by using the interface shown in FIG. 16. Application tier 1702 provides the interface to client 1710 and forwards the query to mashup engine 1704. Mashup engine 1704 receives the query, annotates the query, and provides it to lighting system 1708. In the example shown, lighting system 1708 includes query categorizer 1302 and lighting engine 1304. Lighting system 1708 receives the annotated query and provides back to mashup engine 1704 a list of concepts with which the query is associated, and a set of weights, using the classification techniques described herein. Mashup engine 1704 selects an appropriate page template from template database 1716, consults module database 1706 for information about candidate modules, fetches information from module cache 1714 and external sources 1712 as applicable to a set of candidate modules, and makes a selection of which modules are to be presented to the user and how they are to be arranged. Mashup engine 1704 provides an XML page specification to application tier 1702 that describes how the page is to be rendered for the user.

Template database 1716 stores a variety of page templates. In some embodiments another technique, such as the use of a single XML document, is used to store page templates. Any node in subject hierarchy 1328 can have associated with it one or more page templates. In some embodiments templates are managed by product managers who create templates that are appropriate for the verticals they oversee. For example, a template tagged to the health node might favor the inclusion of modules that provide "definitions" (e.g., a Wikipedia module, a physicians' desk reference module, etc.), while a template tagged to the travel vertical might favor the inclusion of more map modules. The root node of subject hierarchy 1328 has a default template that is used if no other template is selected. In various embodiments, page templates are contributed by community members, such as users who are interested in a particular topic. Other community editors can edit the page templates or provide their own page templates for concepts.

In addition to the selection and layout of modules, page templates allow for the customization of such page features as background color, the use of cascading style sheets, etc. The templates stored in template database 1716 are tagged with one or more categories with which they are intended to be used. Instructions can also be included in a template with respect to the customization of specific modules. For example, the Wikipedia snippet module (1606) can be used by a variety of different page templates. Suppose the manager of a Health vertical wishes Wikipedia to return 10 lines of text, while the manager of a Transportation vertical only wishes Wikipedia to return 5 lines of text. A single implementation of the module can be used in both circumstances by having the respective page templates for those verticals provide different parameters to the Wikipedia snippet module (e.g., show 10 lines vs. show 5 lines; make the text blue vs. white; make the widget 100 pixels wide vs. 200 pixels wide; etc.).

At runtime, mashup engine 1704 creates a reverse index that loads into memory a mapping between the page templates and the concepts to which they are mapped. A similar mapping is made between module specifications stored in module database 1706 and the concepts to which the modules they are mapped. Many thousands of modules, or more, may be described by module specifications stored in module database 1706. The modules are created by third parties and submitted for use with system 1700 by their creators, or selected for inclusion by a curator of database 1706. Modules can provide virtually any user experience about virtually any concept. RSS feeds, calculators, images, videos, sounds, interactive maps, and games are examples of types of modules.

Each module specification includes a variety of information about the module, such as the name of the module; a description of the module; whether the module can accept any predefined parameters such as query, zipcode, parsed concept, etc.; the maximum time that content for the module should be cached; a minimum and maximum width for the module if it is to be displayed on a page in overview mode; a minimum and maximum width for the module if it is to be displayed on a page in detail mode; the concepts to which the module is tagged (typically configured by an administrator when the module specification is first created); the module's preferred location within a column if selected; etc. In various embodiments, the concept is tagged with subject type concepts, infotypes, or both.

The module specification can also include a group of user-defined tags that allow the modules to be arbitrarily grouped. For example, one administrator might tag certain modules as being "yellow," "horizontal," or provided by the "Acme Corporation."

A module specification can also specify a set of conditions that must be present for a module to be selected, such as that a location specific module should only be shown if the location of the user is known, or that a module only be shown at certain times of the day (e.g., during the opening hours of a business who maintains the module) or just before certain holidays or events such as annual sporting events. Another example of a condition that a module may require is that the query appear in the name of the module. For example, suppose one of the widgets defined in module database 1706 provides a list of Irish Setters currently available for adoption from an Irish Setter dog rescue group. The module specification may require that a user's query include the term "Irish Setter" in order for the module to be shown, irrespective of the categories with which the query is associated.

If the module requires information from an external source, the module specification also stores a description of how the information is to be fetched—such as which protocols are to be used, and how any strings are to be formatted. The module specification also stores whether results for the module should be cached (and if so for how long) or if they should be fetched anew each time the module is considered for inclusion on a page such as page 1600. For example, a blog or news widget might have an expiry term of ten minutes. Generally, an attempt is made to cache external services to control the amount of traffic that is sent to those services—both reducing the impact on the resources of the external source and also to improve efficiency. Additionally, if an external site is responding slowly to requests for information or if it becomes unavailable, it may nonetheless be possible to present modules that make use of the external site if sufficient information from the external site is available in the cache. Some modules are JavaScript code and are not rendered until runtime on client 1710. In some embodiments the JavaScript code is cached in module cache 1714.

In some embodiments system 1700 is configured to communicate with an advertisement server (not shown). Page templates may specify page blocks that can include advertising modules, that 20-30% of the page's space should be dedicated to monetization, the specific advertisements/monetization widgets that should be selected by mashup engine 1704, etc. Historical information such as the number of advertising clicks received when a particular module was displayed last time can be used to determine which monetization modules, if any, should be shown on page 1600. In some embodiments if a shopping intent is detected (e.g., "buy new shoes,"), more space may be allocated to monetization units.

Figure 18:
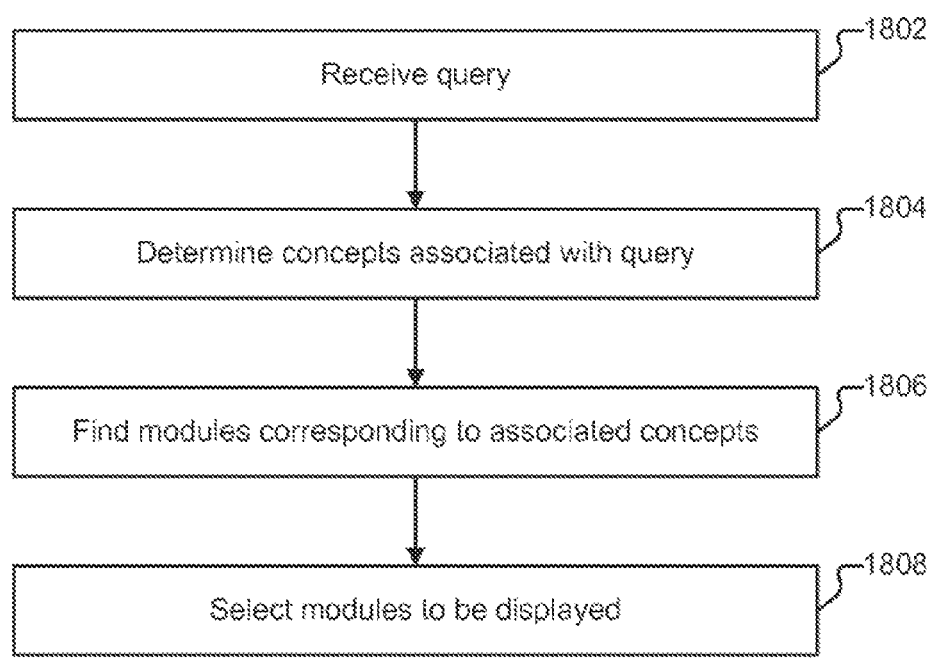
FIG. 18 is a flow chart illustrating an embodiment of a process for delivering a page that includes a plurality of modules.

FIG. 18 is a flow chart illustrating an embodiment of a process for delivering a page that includes a plurality of modules. In some embodiments the process shown in FIG. 18 is performed by system 1700. In some embodiments, whenever system 1700 performs a task, either a single component or a subset of components or all components of system 1700 may cooperate to perform the task. Similarly, in some embodiments portions of system 1700 are provided by one or more third parties.

The process begins at 1802 when a query is received. For example, at 1802 "What color is an Irish setter," is received by application tier 1702 from client 1710. At 1804, categories associated with the query are determined. For example, at 1804, mashup engine 1704 provides the query to lighting system 1708 which determines that the main concept associated with the query is "dog." Lighting system 1708 provides a portion of hierarchy 128 that includes the node "dog" to mashup engine 1704, along with a set of weights that describe how closely the query matched the portions of the hierarchy provided.

At 1806, candidate modules to be provided to the user are located. Suppose only one page template is present in template database 1716 and that it specifies, for any query, that somewhere between 6 and 10 modules be presented on the page and does not specify any additional constraints on the modules. At 1806, the concept, "dog" as received from lighting system 1708 is used to locate modules in modules database 1706. Suppose twenty modules have "dog" as a tag, and several additional modules have as tags the parent concept, "pets." At 1808, system 1700 determines which modules of those identified should be displayed to the user.

Figure 19:
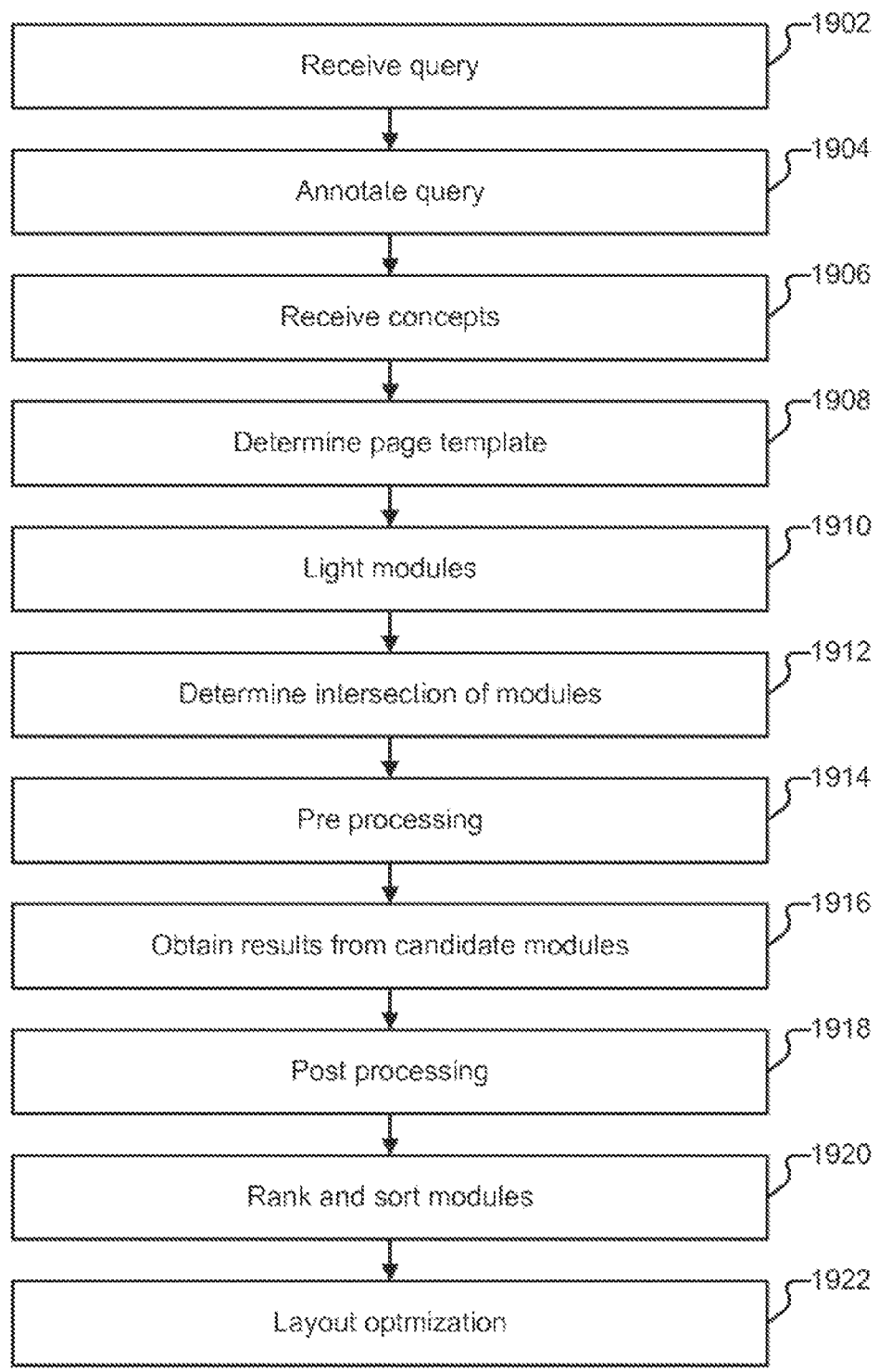
FIG. 19 is a flow chart illustrating an embodiment of a process for delivering a page that includes a plurality of modules.

FIG. 19 is a flow chart illustrating an embodiment of a process for delivering a page that includes a plurality of modules. In some embodiments the process shown in FIG. 19 is performed by system 1700.

The process begins at 1902 when a query is received. At 1904 the received query is optionally annotated. In some embodiments the query annotation is performed by mashup engine 1704 and is performed using word lists. Query annotation is typically used in the identification of a context of a query. For example in the query, "I want pictures of a black dog," the phrase "pictures of" indicates an intent of the user (to find pictures) and "black dog" is the concept for which pictures are sought. Similarly, in the query "where can I buy a new pair of shoes," the user's intent is found in the phrase "where can I buy" and the object of that intent is "shoes." A query of "what is a platypus" reveals a definition intent ("what is a") with a subject of "platypus." Once any intents are identified, the annotated query (e.g., in which "pictures of a spider bite" becomes "spider bite"+images) is provided to lighting system 1708.

At 1906, one or more concepts are received. For example, at 1906 lighting system 1708 provides mashup engine 1704 with any concepts and surprises associated with the query as determined using the techniques described herein, along with the scores associated with those concepts.

At 1908 a page template is selected. One way of selecting a page template is to perform a bottom up search as follows.

Locate the first received concept of the query (i.e., the main concept) in subject hierarchy 1328. If there is a page template tagged to the concept, use that template. If not, locate the second received concept of the query (e.g., the first concept's parent) and determine whether that concept has a template. If so, the parent template is used. If not, the hierarchy is traversed higher and higher until a node with a template tagged to it is reached. Every query will have at least one available template because the root node has a page template whose requirements all relate to layout and do not relate to conditions for being selected. If a node has multiple templates available, the first template is evaluated to determine whether any conditions it may have are satisfied. If so, the template is selected. If not, the next template at that level is evaluated. If none of the templates at a level have their conditions satisfied, the templates at the node's parent are evaluated, and so on.

One reason that a concept may have multiple templates is that one template is a default and a second template is part of an advertising or other branding campaign. For example, suppose a news corporation has a partnership with the operator of system 1700. Visitors who arrive on a landing page provided by system 1700 (e.g., a page generated for the concept of "health") by selecting a link from a page on the news corporation's site are to be shown a page such as is shown in FIG. 16, but with the logo of the news corporation in one corner, along with a link back to the news corporation's website. Such users are identified in some embodiments by a string such as "partnerID=XYZ" being provided by the referring site, where XYZ is the identity of the partner.

Users of system 1700 who do not arrive from news corporation site will not have a partnerID string equal to XYZ and will be presented with a page constructed from the default health template instead. Other factors which can also be used to determine which template will be used for a user are the user's location (such as can be approximated from the user's IP address), and a probability, such as that 90% of users receive a first template and 10% of users receive a second template during A/B testing. In some embodiments, a page defined in template database 1716 has multiple modes—such as an overview version and a detail version. Different templates may also be selected at the same node based on the user's platform. A mobile user who submits a query may receive a page with fewer modules, or with mobile-phone friendly modules than a PC-based user who submits the same query.

Other techniques for selecting a page template can also be used at 1908 and can be used in combination with the technique described above. For example, a query white list can be constructed so that when a query containing a certain term is received, a custom template is used. One example of this is a sponsored product page. Suppose a query of "ibuprofen" is received. If "ibuprofen" is present on a whitelist, instead of using a "Drugs" template or a "Health" template, a template that describes a page branded with the logo of a particular manufacturer of ibuprofen may be selected instead.

If both overview and detail versions of a page template exist, in some embodiments one of the determinations made at 1908 is whether the intent of the query implicates one or the other of the versions. For example, a query of "spider bite pictures" indicates that a user is likely to want to view many pictures and the detailed version of page may be automatically selected over the overview page.

At 1910, mashup engine 1704 determines an initial list of candidate modules to be considered for inclusion in page 1600. This process is also referred to herein as "module lighting." In some embodiments the candidate list of modules is selected by determining a location in subject hierarchy 1328 associated with the query, and examining whether any modules are tagged at the same level of the hierarchy. If so, they are added to the candidate list of modules. Additional modules can be added to the candidate list of modules by traversing up or down levels in the hierarchy. Typically, the lower in the tree a module is tagged, the more narrow or specific that module will be. For example, a "dog breed selector" widget that shows various images of dogs and provides information about their temperaments and size is an example of a widget that is likely to be tagged to the concept dog. If the query received at 1902 relates to a specific kind of dog, the dog breed selector widget is likely to be of more relevance to the user than a much more general "animal viewer" widget that is tagged at the animal level.

Some modules may be generic to the category structure. For example, a web results module or news module is a generic module that is applicable to virtually any topic. (E.g., health news, news about airplanes, news about Ronald Reagan, etc.) Assorted techniques can be used to light such modules, such as by performing an offline precomputation of the recall of the module with respect to all concepts and using the results to determine whether to show the generic module or not.

Modules can also be tagged with recall information, and that information can be used to determine whether the query received from client 1710 should be passed to the module or whether the query should be transformed first. For example, an image module is likely to have very poor recall for certain kinds of queries, such as tail queries, which contain several infrequently used words. Based on the recall information, assorted query transformations can be used, as explained in more detail below. Other examples of categories of queries for which recall information may be stored by a module include navigational queries (e.g., as determined by a white list), broad queries, and ambiguous queries (e.g., as identified by lighting system 1708).

Infotypes can also be used when determining whether to light generic modules. For example, if the query is about a celebrity, the query may be determined to be "image worthy." If a query lights the image infotype, then modules tagged with the image infotype may be lit, or have their lighting scores increased as a result. The concept, "honesty," however is not an image-worthy quote and as such a general image module would not be considered.

As mentioned previously, modules may have associated constraints that are taken into consideration at 1910. For example, a stock ticker module may require that a user provide a query that includes the word, "stock" for it to be shown. Modules can also have an "and" requirement that requires two different concepts to both be implicated in the query. For example, a travel insurance calculator may require that both "travel" and "insurance" be returned at 1906 in order for it to be shown. A module may also have as a constraint that it only be selected if another specific module is selected, or that if another specific module is selected, it not be selected. A module can have multiple sizes associated with it or can take a size in which it must be rendered. Modules can be dropped or moved if they don't fit the layout for the page. Hence an additional constraint is that the module should fit the layout of the page.

In some embodiments a threshold is applied during module lighting to remove modules that light up due to low scoring concepts. For example, there may exist concepts that are lit but which have very low affinity with the query. In such cases these modules attached to such low scoring concepts would not be relevant to the query and are dropped from the list of candidate modules. As an example, suppose the received query is "Seinfeld." Many concepts are lit, of which "American media" is an example of a low scoring concept, having a query to text affinity score of 0.4 and density score of 0. In this case the "American media" concept will get dropped because the threshold is set to 1.

Module to concept affinity is a weight specified when the module is first added to the module database. The weight is used to rank the module against the other modules tagged to the same concept. One example of how the score can be computed is: module worthiness score=module to concept affinity*(query to concept affinity+density score). Suppose there exist two modules, called bmicalc1 and bmicalc2, respectively, which are both tagged to the same concept. The module to concept affinity score will help select one over the other. And, if the module worthiness score is very low (e.g., less than 0.61), the module is removed from the candidate list. A variant to the score function is score=module to concept affinity*(w1*query to concept affinity+w2*density score) to indicate a weighted average and where w1 and w2 are the weights. Another variant to the score function takes into consideration past information such as module performance (turn-around-time), user feedback (e.g. click through rate). Score=module to concept affinity*(w1*query to concept affinity+w2*density score+w3*performance_score+w4*click_through_rate).

The above variants are scoring functions that are used for un-cached modules and/or for modules where data is not yet available, and is also referred to as a pre-scoring function. For a cached module this scoring function is not run because the score is retrieved from the cache. The pre-scoring function assists in selecting modules for which external calls are made to get data. Modules' scores are adjusted after data is made available for them. As described in more detail below, a post-scoring function is used at 1920 to combine the quality score (if any) with the pre-score, and any other scores. This score is then used to finally rank modules before returning them back for rendering.

At 1912, an intersection is determined between the candidate modules selected at 1910 and any requirements on modules specified by the page template. Typically, if a module requested by a page template is not also selected as a candidate module at 1910, that module will not be included in the page. However, an administrator may specify, e.g., using a "force" option, that a particular module must be included in the page, irrespective of any scores it receives during module lighting.

At 1914, optional preprocessing is performed as described in more detail below. One example of preprocessing that can be performed at 1914 is a determination of the best inputs to send to a candidate module that accepts input. For example, instead of sending a query of "my twelve year old child has diabetes," a query of "juvenile diabetes" or just "diabetes" may be sent to some modules. Another example of preprocessing that can be performed at 1914 is the offline computation of the recall of the module with respect to all concepts.

At 1916, the query is forwarded to each of the candidate modules that is configured to receive as input a query. In some cases, module results may be present in a cache. If so, the module cache is queried. If results for the module are not present in the cache, in some embodiments an external call is made, and the results may be cached for later use, as applicable.

At 1918, postprocessing is performed. Two different types of post processing can be performed at 1918. One form of post processing is an evaluation of the results obtained from modules (either via the module cache or via the external query) at 1916. This form of post processing is also referred to herein as evaluating the quality of the results provided by the module and is described in more detail below.

The other form of postprocessing that can be performed at 1918 is content transformation. Suppose a module chooses to render itself with a white background. At 1918, one of the post processing actions that can be taken is to search for the existence of "bg=white" or "bg=0xFFF," and then replace the detected string with "bg=red" or "bg=0xF00" as applicable, switching the background of the module from white to red. Caption text can be similarly modified, such as by substituting one company name with another, by removing captions, or by adding captions, such as the caption shown at 1624 in FIG. 16.

Content reduction can also be performed at 1918. For example, a module may provide more information than a product manager chooses to have rendered on a page. At 1918 instructions in the page template can be used to remove unwanted portions of the module as applicable.

At 1920, the remaining candidate modules are ranked and sorted. A variety of techniques can be used to score/rank the modules. In addition to density, text affinity, module to concept affinity and other pre-scores, one factor that can be considered is the response time of the module. A module that provides results quickly may be ranked higher than one that provides results slowly, even if the slower module is otherwise a better match with the query. In some embodiments, each time a module is queried, a response time is stored in a log. The log can be evaluated periodically to determine an average response time, or a running average response time, etc. Another factor that can be considered is feedback. One measure of how useful a module is to a user is whether the user interacts with the module, and if so, for how long. Such information can be collected and stored in a log for use at 1920. For example, implicit feedback (e.g., clickthrough rates) can be collected. Explicit feedback can be collected by allowing the user to select "don't show this again" or "this is helpful" buttons under each module, by performing polls, A/B testing, etc. Another factor that can be considered is the timeliness of the module. For example, an April 15 countdown timer widget may be of little interest to a user in September, even if the query indicates a strong interest in tax information. In March, however, the widget may receive a considerably higher score. Another factor that can be considered is whether the module is maintained by an individual (e.g., a hobbyist or amateur developer) or whether the module is supplied by a professional organization.

In some embodiments system 1700 maintains information about specific users, such as through the use of cookies. In that case, one of the factors that can be considered at 1920 is whether the user has previously seen a module, whether the user previously indicated that the module was useful or not, etc. Other usage information can also be considered, such as past queries. For example, suppose a user consistently queries for natural remedies-type health information and then performs a query of "headache"—the results page may be skewed toward natural remedies for a headache, while another user (or a new user for whom no historical data is known) may be shown a page that is more weighted to over-the-counter remedies for headaches. In some embodiments a plugin is used to capture information about the user and to provide the information to system 1700.

Monetization considerations can also be made at 1920. Some page templates reserve a portion of the page's real estate for things that generate money, such as advertisements. Within that space, different kinds of monetization modules compete for space. Examples of monetization modules include CPC modules (e.g. Google/Yahoo ads), TPM modules (visual ads), CPA modules (e.g. flight booking widgets/ where a company performs an action on the backend). Based on the query and what lights up, different monetization modules compete for the monetization real estate in the same way that content modules compete for content real estate. In some embodiments monetization modules are confined to a particular region of the page (e.g., banner area, right side), in some embodiments monetization modules may appear anywhere on the page but may not take up more than a fixed number of slots (e.g., 3) or total space (e.g., 30%), etc.

Techniques such as A/B testing can be used to keep track of which layout and module selections generate more revenue, such as whether a banner region and no skyscraper should be shown, or whether both should be shown, and whether an advertisement should be shown at the bottom of the screen. Each combination can be tried and compared against other combinations. As another example, suppose that lighting system 1708 is aware that a query is related to the concept, "herbs." An advertising analysis engine (not shown) can be configured to keep track of different concepts and which modules monetize best for those queries. For example, it may be the case that for an "herbs" query, advertisements provided by one advertising entity do not monetize as well as advertisements provided by another.

In some embodiments the percentage of the page dedicated to monetization may also change and can be dynamically returned based on the query. If the query has commercial intent ("buy cheap tickets") then there will be more monetization as the user is indicating they are looking for advertisements—they want to buy tickets.

At 1922, layout optimization is performed so that the page ultimately provided to the user is free of excessive gaps of space. For example, suppose a total of ten modules are ultimately selected to be returned to a user on page 1600. At 1922, the arrangement of those ten modules is determined.

Figure 20A:
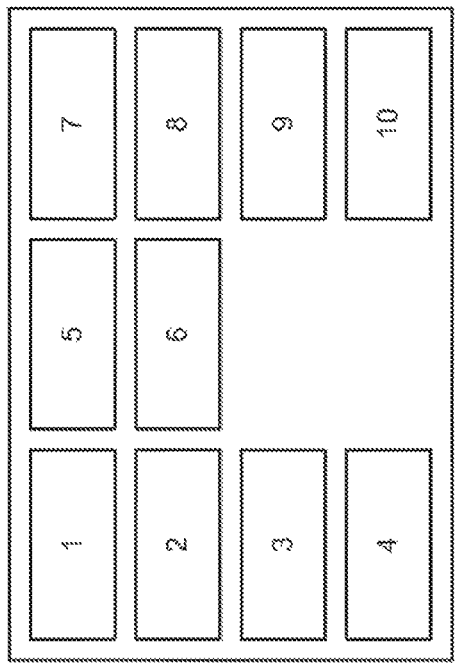
FIG. 20A illustrates an example of a page layout.

FIG. 20A illustrates an example of a page layout. In the example shown, the columns are uneven—there are four modules in the first and third columns, but only two modules in the second column. One reason that the columns might be uneven is that a product manager may have incorrectly configured the page template. Since modules are picked dynamically, it can be difficult to predict at the time the page template is created what an attractive layout will be. In some embodiments mashup system 1700 is configured to override a template if it would result in a gap such as the one shown in FIG. 20A.

One technique for improving the layout of the page shown in FIG. 20A is to perform the following process. First, determine the total number of modules to be presented on the page and divide by the number of columns. This gives an indication of an equal distribution. Next, determine how much the proposed layout deviates from the equal distribution. This deviation is referred to herein as a layout quality score. If the layout quality score exceeds a threshold (i.e., the layout is not considered optimal) a fixing process is performed. One example of a fixing function is to identify the column with the highest number of modules and move the bottom module from that column to the column with the lowest number of modules. The layout quality is reevaluated and if necessary the fixing function is applied again, iteratively, until any additional movements are not possible—either due to page template constraints (e.g., against moving certain modules, such as advertisements) or due to any additional movements having no improvement effect.

Figure 20B:
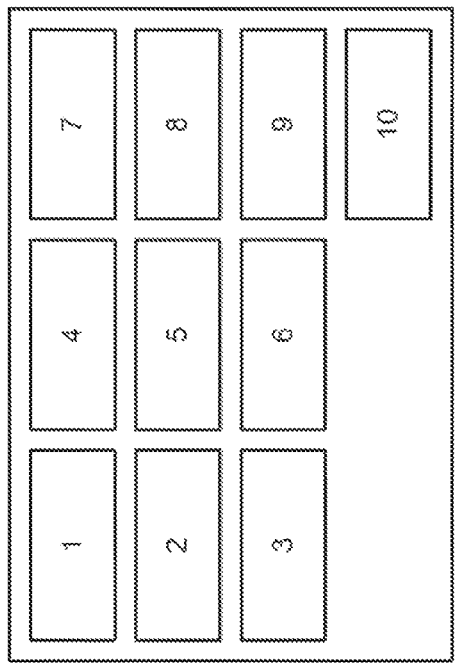
FIG. 20B illustrates an example of a page layout.

FIG. 20B illustrates an example of a page layout. In the example shown, the bottom module in the first column has been moved to the top of column two. No additional movements can be made to further optimize the layout shown in FIG. 20B. The final page layout is passed, e.g., as XML, to application tier 1702 so that a fully rendered version can be provided to client 1710.

Figure 20C:
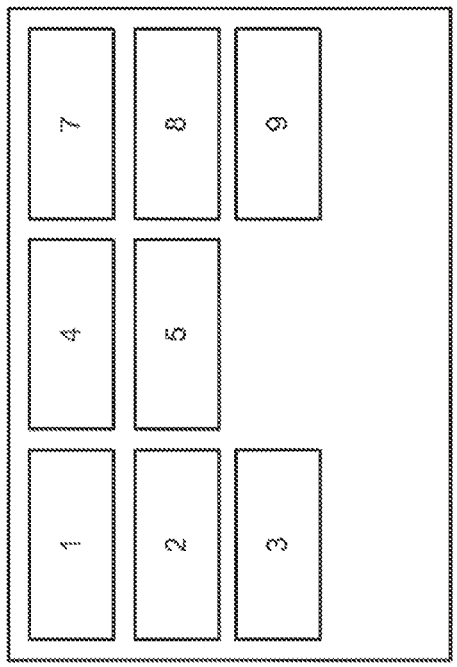
FIG. 20C illustrates an example of a page layout.

FIG. 20C illustrates an example of a page layout. In the example shown, a gap is present in column two that cannot be fixed by using the process described in conjunction with FIG. 20A. In some embodiments one way of improving the layout in such a situation is to expand module 3 so that it spans the first two columns. Another way of improving the layout is to extend the length of module 5 so that it occupies more of the empty space below it. Some modules may have included in their respective module specifications that they should not be expanded. Other modules may support expansion. Such information can be taken into account when selecting/ranking modules as well.

Figure 20D:
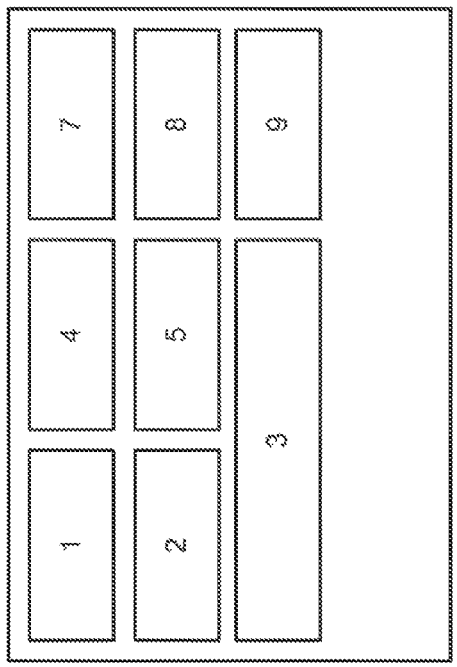
FIG. 20D illustrates an example of a page layout.

FIG. 20D illustrates an example of a page layout. In the example shown, the gap present in the layout shown in FIG. 20C has been removed by expanding module 3 across the first two columns.

Providing Information to Modules

Figure 21:
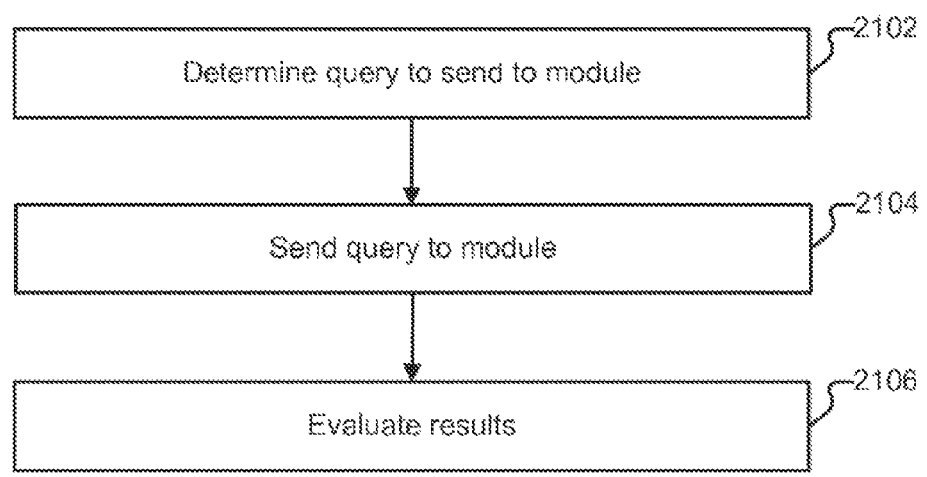
FIG. 21 illustrates an embodiment of a process for providing information to a module.

FIG. 21 illustrates an embodiment of a process for providing information to a module. In some embodiments portion 2102 of the process shown in FIG. 21 is performed at 1914 in the process shown in FIG. 19, and portion 2106 is performed at 1918 in the process shown in FIG. 19. In various embodiments the process shown in FIG. 21 is performed by a standalone device that is not part of system 1700.

The process begins at 2102 when a determination is made of what query to send to a module. For many modules, such as modules that provide traditional text based web results, the originally-supplied query (e.g., as received from client 1710) is provided to the module. As mentioned previously, many modules do not accept queries or other input parameters and the processing at 2100 is not performed. However, some queries, when sent to some modules, will not result in the best user experience.

One example of a query that can result in poor results from a module is where a "tail query" (e.g. one that is very specific and has many non-stop words) is sent to a photo or video hosting site through a module that provides a frontend to the site. A query of "my son Fred is six and he has diabetes" is very unlikely to match any videos hosted by the site. In such circumstances, a query transformation can be performed so that more relevant (or in some cases, any reasonable) results are returned.

A query can be transformed in a variety of ways. One way of transforming a query is to send a shorter portion of the query. In the Fred example, one example transformation is to send just the word "diabetes." The word "diabetes" is selected by picking the word n-gram in the query that contributed the most to the selection of the query's main concept. Another way of transforming a query is to send the top concept associated with the query instead of the query itself. Again using the Fred example, a top concept for the query might be "juvenile diabetes." Yet another way of transforming a query is to send one or more synonyms for terms in the query. For example, if the query received from client 1710 is "feline," in some embodiments a synonym (e.g., "cat") is selected from a list of synonyms and sent as a query instead. As another example, suppose a user submits a query of "rooster comb injection." Rooster comb, given as an injection, is a treatment that some individuals use for arthritis. The tissue of a rooster comb includes hyaluronic acid—a synonym. Thus in some embodiments a query of "buy some rooster comb for an injection" might be transformed into "buy some hyaluronic acid" at 2100.

Another example of a query that can result in poor results from a module is as follows. One meaning of the string, "JSON," is "JavaScript Object Notation." JSON is also a frequent misspelling of the name "Jason." Suppose a user is interested in finding information having to do with JavaScript and provides as a query "JSON." If the query is passed, as is, to a video module, it is likely that many of the videos returned will be about people named Jason and not about JavaScript. One way of addressing this problem is through the use of query augmentation. The video site with which the video module communicates has its own hierarchy into which videos can be classified, and accepts as command line "hints," a category that should be searched. By sending the appropriate category along with the query, more appropriate results can be obtained. In some embodiments a mapping is maintained between at least some of the concepts in subject hierarchy 1328 and the concepts in the external video site. For example, while JSON may have as its main concept "JavaScript" in hierarchy 1328, a hierarchy maintained by a video site is likely to be much smaller. A mapping between JavaScript (in hierarchy 1328) and Technology (in the video taxonomy) may be used so that the query provided to the video module is "JSON:Technology."

In some embodiments a ConceptDF is precomputed for every concept with respect to a module. The information can be used to determine a query transformation. For example, suppose a user is seeking "funny quotes by Kosmo Kramer." A module is described in module database 1706 that takes as input the name of a television show or movie and provides as output quotes from the show/movie. Sending the module the query, or even a shortened version of the query (i.e., the concept, "Kosmo Kramer") will not provide any results because Kosmo Kramer is not the name of a show/movie. By examining the ConceptDF for the concept's parent, however, it is determined that the concept "Seinfeld" when passed to the module does provide results. Thus in some embodiments the ConceptDF is considered when transforming a query (and/or when determining what parameters to send to a module). Similarly, suppose another module in module database 1706 provides current information on assorted financial indices. Sending the module a query of "Johnny Stocks" (the baseball player) is likely to result in a fairly high recall. However, since the top concepts for Johnny Stocks are "baseball" and "athlete" the query will not be sent because those concepts have no recall or extremely low recall for the module.

At 2104, the query determined at 2102 is sent to the module.

At 2106, results returned by the module are evaluated, for example, to determine whether the query provided at 2102 yielded better results than the one originally received; to determine whether the received results are of sufficiently high quality to merit including the module in page 1600; etc. In various embodiments, the processing performed at 2106 is performed for all queries, irrespective of whether the originally received query is transformed or not.

A variety of techniques can be used to evaluate the results at 2106. One example is to use a recall ratio. A recall ratio is a ratio between the number of results for a module (for example, images) and the number of web results in our index. If the recall ratio of a module is small, then the module does not likely produce good results. If the recall ratio is high, then the module likely produces good results.

Another example is to use text scoring on the results. For any module, the number of times the given query has occurred in the results is determined. If that number is small, then the module likely does not produce good results. If the number is large, then the module likely produces good results.

A combination function can also be employed so that results with extremely high recall ratios are not penalized for having low text scores and vice versa.

Yet another example is to use pattern matching on the results. The occurrence of certain patterns, such as "403 error" and "no result" in the results received from a module indicate that the quality of results returned by that module may be low.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for determining one or more concepts associated with a query, comprising:
   a processor configured to:
      receive a query;
      receive a list of result documents ordered by relevance to the query;
      receive a list of candidate concepts, the concepts being tags associated with the result documents, the concepts fitting within a concept hierarchy;
      use a density function to evaluate the received concepts by identifying the concept hierarchy within which the received concepts fit, identifying an affinity score for each of the concepts which measure how closely the concept match the query, and determining a density score for each of the concepts, wherein the density score relates affinity scores for children concepts located underneath one of the concepts to the number of children concepts beneath said one of the concepts;
      wherein the density score more specifically relates a summation of affinity scores for children concepts underneath said one of the concepts to a number of paths to the children concepts;
      wherein concepts in the concept hierarchy comprise branch nodes which are connected to lower level children concepts and leaf nodes which are not connected to lower children concepts, and wherein the density score for a branch node more specifically divides a summation of affinity scores for leaf nodes which are lower level children concepts associated with said branch node by a number of paths to the leaf nodes which are lower level children concepts associated with said branch node; and
      associate one or more concepts with the query based at least in part on the results of the density function; and
   a memory coupled to the processor and configured to provide the processor with instructions.

2. The system of claim 1, wherein the density score more specifically relates a summation of affinity scores for children concepts underneath said one of the concepts to a number of children concepts underneath said one of the concepts.

3. The system of claim 1, wherein the processor is further configured to:
   determine concept voting scores, each concept voting score indicating the prevalence of a concept being tagged to individual documents of the list of result documents.

4. The system of claim 3, wherein the concept voting score indicates how frequently a concept is associated with result documents in the list of result documents.

5. The system of claim 3, wherein each individual document of the list of result documents comprises a text match score, the text match score for each individual document being determined from the document's order of relevance to the query, and wherein the concept voting scores more specifically comprise a sum of text match scores for result documents with which the associated concept is tagged.

6. The system of claim 3, wherein the processor is further configured to determine cooccurrence scores, each cooccurrence score comprising a voting score compared with an expected cooccurrence score for the associated concept, the expected cooccurrence score comprising the multiplication product of: a number of result documents divided by a number of documents in a searched index and a number of documents in the searched index having the associated concept tagged thereto divided by the number of documents in the searched index.

7. The system of claim 6, wherein the processor is further configured to determine a combined score to return results from the query, and wherein the combined score is determined using a combination function which combines a text score used to determine document relevance to the query, the voting score, and an expected cooccurrence which indicates the statistical likelihood of random association between an individual document and a concept based on the number of documents in a searched index.

8. A computer implemented method for determining one or more concepts associated with a query, comprising:
   a computer receiving a query;
   the computer receiving a list of result documents ordered by relevance to the query;
   the computer receiving a list of candidate concepts, the concepts being tags associated with the result documents, the concepts fitting within a concept hierarchy;
   the computer using a density function to evaluate the received concepts by identifying the concept hierarchy within which the received concepts fit, identifying a parent concept, and evaluating the parent concept by relating a number of child concepts connected to the parent concept with a number of paths connecting the child concepts to the parent concept; and
      wherein the density score more specifically relates a summation of affinity scores for children concepts underneath said one of the concepts to a number of paths to the children concepts;
      wherein concepts in the concept hierarchy comprise branch nodes which are connected to lower level children concepts and leaf nodes which are not connected to lower children concepts, and wherein the density score for a branch node more specifically divides a summation of affinity scores for leaf nodes which are lower level children concepts associated with said branch node by a number of paths to the leaf nodes which are lower level children concepts associated with said branch node; and
   the computer associating one or more concepts with the query based at least in part on the results of the density function.

9. The method of claim 8, wherein the step of using a density function to evaluate the received concepts more specifically comprises identifying an affinity score for each of the concepts which measure how closely the concept match the query, and determining a density score for each of the concepts, wherein the density score relates affinity scores for children concepts located underneath one of the concepts to the number of children concepts beneath said one of the concepts.

10. The method of claim 9, wherein the method more specifically comprises relating a summation of affinity scores for children concepts underneath said one of the concepts to a number of children concepts underneath said one of the concepts.

11. The method of claim 9, wherein the method further comprises:
   determining concept voting scores, each concept voting score indicating the prevalence of a concept being tagged to individual documents of the list of result documents.

12. The method of claim 11, wherein the concept voting score indicates how frequently a concept is associated with result documents in the list of result documents.

13. The method of claim 11, wherein the method comprises:
   determining a text match score for each individual document of the list of result documents from the document's order of relevance to the query; and
   determining concept voting scores from a sum of text match scores for result documents with which the associated concept is tagged.

14. The method of claim 11, wherein the method further comprises determining cooccurrence scores, wherein each cooccurrence score comprises a voting score compared with an expected cooccurrence score for the associated concept, and wherein the expected cooccurrence score comprises the multiplication product of: a number of result documents divided by a number of documents in a searched index and a number of documents in the searched index having the associated concept tagged thereto divided by the number of documents in the searched index.

15. The method of claim 14, wherein the method further comprises determining a combined score to return results from the query, and wherein the combined score is determined using a combination function which combines a text score used to determine document relevance to the query, the voting score, and an expected cooccurrence which indicates the statistical likelihood of random association between an individual document and a concept based on the number of documents in a searched index.

16. A system for determining one or more concepts associated with a query, comprising:
   a processor configured to:
      receive a query;
      receive a list of result documents ordered by relevance to the query; receive a list of candidate concepts, the concepts being tags associated with the result documents, the concepts fitting within a concept hierarchy;
      use a density function to evaluate the received concepts by identifying the concept hierarchy within which the received concepts fit, identifying an affinity score for each of the concepts which measure how closely the concept match the query, and
      determining a density score for each of the concepts, wherein the density score relates affinity scores for children concepts located underneath one of the concepts to the number of children concepts beneath said one of the concepts;
      determine concept voting scores, each concept voting score indicating the prevalence of a concept being tagged to individual documents of the list of result documents;
      determine cooccurrence scores, each cooccurrence score comprising a voting score compared with an expected cooccurrence score for the associated concept, the expected cooccurrence score comprising the multiplication product of: a number of result documents divided by a number of documents in a searched index and a number of documents in the searched index having the associated concept tagged thereto divided by the number of documents in the searched index; and associate one or more concepts with the query based at least in part on the results of the density function; and a memory coupled to the processor and configured to provide the processor with instructions.

17. The system of claim 16, wherein the processor is further configured to determine a combined score to return results from the query, and wherein the combined score is determined using a combination function which combines a text score used to determine document relevance to the query, the voting score, and an expected cooccurrence which indicates the statistical likelihood of random association between an individual document and a concept based on the number of documents in a searched index.

* * * * *